(12) United States Patent
Kim et al.

(10) Patent No.: US 12,288,895 B2
(45) Date of Patent: *Apr. 29, 2025

(54) ENERGY STORAGE MODULE

(71) Applicant: Samsung SDI Co., Ltd., Yongin-si (KR)

(72) Inventors: Jin Taek Kim, Yongin-si (KR); Eun Ok Kwak, Yongin-si (KR); Jang Hoon Kim, Yongin-si (KR); Jin Bhum Yun, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,061

(22) Filed: Sep. 8, 2020

(65) Prior Publication Data
US 2021/0074980 A1 Mar. 11, 2021

(30) Foreign Application Priority Data

Sep. 5, 2019 (KR) .................. 10-2019-0110362
Sep. 4, 2020 (KR) .................. 10-2020-0113372

(51) Int. Cl.
*H01M 50/35* (2021.01)
*H01M 50/148* (2021.01)
(Continued)

(52) U.S. Cl.
CPC ......... *H01M 50/35* (2021.01); *H01M 50/148* (2021.01); *H01M 50/375* (2021.01); *H01M 50/383* (2021.01); *H01M 50/394* (2021.01)

(58) Field of Classification Search
CPC .... H01M 50/30; H01M 50/358; H01M 50/35; H01M 50/375; H01M 50/383;
(Continued)

(56) References Cited

U.S. PATENT DOCUMENTS 5,047,272 A  9/1991  Hassel et al.
5,817,434 A  10/1998  Brooker et al.
(Continued)

FOREIGN PATENT DOCUMENTS

CN   101847709 A   9/2010
CN   102468463 A   5/2012
(Continued)

OTHER PUBLICATIONS

Notice of Allowance for U.S. Appl. No. 16/844,914 dated Dec. 8, 2022, 8 pages.
(Continued)

*Primary Examiner* — Matthew T Martin
*Assistant Examiner* — Ankith R Sripathi
(74) *Attorney, Agent, or Firm* — Womble Bond Dickinson (US) LLP

(57) ABSTRACT

An energy storage module includes: a cover member accommodating a plurality of battery cells in an internal receiving space, each of the battery cells including a vent; a top plate coupled to a top of the cover member and including a duct corresponding to the vent of at least one of the battery cells; a top cover coupled to a top of the top plate and having an exhaust area corresponding to the duct, the exhaust area having a plurality of discharge openings, the top cover including a protrusion protruding from a bottom surface of the top cover, the protrusion extending around a periphery of the exhaust area and around a distal end of the duct; and an extinguisher sheet between the top cover and the top plate,
(Continued)

the extinguisher sheet being configured to emit a fire extinguishing agent at a reference temperature.

19 Claims, 18 Drawing Sheets

(51) Int. Cl.
*H01M 50/30* (2021.01)
*H01M 50/375* (2021.01)
*H01M 50/383* (2021.01)

(58) Field of Classification Search
CPC .. H01M 50/148; H01M 50/15; H01M 50/152; H01M 50/153; H01M 50/394; H01M 50/20; H01M 50/204; H01M 50/147; H01M 50/591; H01M 50/593; H01M 4/13; H01M 4/36; H01M 4/58; H01M 4/62

See application file for complete search history.

(56) References Cited

U.S. PATENT DOCUMENTS

| | | | |
|---|---|---|---|
| 6,136,423 | A | 10/2000 | Fitzpatrick |
| 6,365,299 | B1 | 4/2002 | Miyaki et al. |
| 7,385,480 | B2 | 6/2008 | Fitzpatrick |
| 8,557,437 | B2 | 10/2013 | Hinoki et al. |
| 8,597,808 | B2 | 12/2013 | Park et al. |
| 8,652,666 | B2 | 2/2014 | Kim |
| 8,722,253 | B2 | 5/2014 | Hinoki et al. |
| 9,406,917 | B2 | 8/2016 | Petzinger |
| 9,627,663 | B2 | 4/2017 | Kim |
| 10,164,229 | B2 | 12/2018 | Ohshiba et al. |
| 10,355,326 | B2 | 7/2019 | Petzinger |
| 10,930,910 | B2 | 2/2021 | Fujiwara et al. |
| 11,038,226 | B2 | 6/2021 | Lee et al. |
| 11,145,933 | B2 | 10/2021 | Kim et al. |
| 11,185,726 | B2 * | 11/2021 | Lee ................ H01M 50/383 |
| 2002/0179552 | A1 * | 12/2002 | Marraffa ............ H01M 50/204 211/186 |
| 2003/0134203 | A1 | 7/2003 | Fan et al. |
| 2007/0164711 | A1 | 7/2007 | Kim et al. |
| 2010/0028758 | A1 | 2/2010 | Eaves et al. |
| 2010/0167115 | A1 | 7/2010 | Okada et al. |
| 2010/0248026 | A1 | 9/2010 | Hinoki et al. |
| 2011/0005781 | A1 | 1/2011 | Yasui et al. |
| 2011/0165454 | A1 | 7/2011 | Iwamoto et al. |
| 2011/0274951 | A1 | 11/2011 | Yasui et al. |
| 2011/0313084 | A1 | 12/2011 | Furar et al. |
| 2012/0114993 | A1 | 5/2012 | Park et al. |
| 2012/0270083 | A1 | 10/2012 | Kim |
| 2013/0011701 | A1 | 1/2013 | Petzinger |
| 2013/0052452 | A1 | 2/2013 | Lee et al. |
| 2013/0264077 | A1 | 10/2013 | Jung |
| 2013/0313466 | A1 | 11/2013 | Bliznets et al. |
| 2013/0344384 | A1 | 12/2013 | Hinoki et al. |
| 2014/0170447 | A1 | 6/2014 | Woehrle et al. |
| 2014/0322566 | A1 | 10/2014 | Kim |
| 2015/0064514 | A1 | 3/2015 | Wu et al. |
| 2015/0079426 | A1 | 3/2015 | Chen et al. |
| 2015/0099191 | A1 | 4/2015 | Liu et al. |
| 2015/0221914 | A1 | 8/2015 | Page et al. |
| 2015/0280193 | A1 | 10/2015 | Ohshiba et al. |
| 2015/0303421 | A1 | 10/2015 | Tazawa et al. |
| 2015/0318526 | A1 | 11/2015 | Mune et al. |
| 2016/0049626 | A1 | 2/2016 | Yasui et al. |
| 2016/0104880 | A1 | 4/2016 | Gao et al. |
| 2016/0218333 | A1 | 7/2016 | Takasaki et al. |
| 2016/0254515 | A1 | 9/2016 | Shimoda et al. |
| 2016/0268564 | A1 | 9/2016 | Cho et al. |
| 2016/0315361 | A1 | 10/2016 | Petzinger |
| 2017/0077545 | A1 | 3/2017 | Shaffer, II et al. |
| 2017/0165513 | A1 | 6/2017 | Li |
| 2017/0334310 | A1 | 11/2017 | Yokoyama et al. |
| 2018/0026245 | A1 | 1/2018 | Page et al. |
| 2018/0190956 | A1 | 7/2018 | Lica et al. |
| 2018/0248160 | A1 | 8/2018 | Lee |
| 2018/0269440 | A1 | 9/2018 | Lee et al. |
| 2018/0294516 | A1 | 10/2018 | Huang et al. |
| 2018/0309107 | A1 | 10/2018 | Widener |
| 2019/0020079 | A1 | 1/2019 | Lee et al. |
| 2019/0109331 | A1 | 4/2019 | Skala |
| 2019/0168037 | A1 | 6/2019 | Lian et al. |
| 2019/0168615 | A1 | 6/2019 | Besson et al. |
| 2019/0173074 | A1 | 6/2019 | Ogawa et al. |
| 2019/0181419 | A1 | 6/2019 | Suba et al. |
| 2019/0305391 | A1 | 10/2019 | Petzinger |
| 2019/0334143 | A1 | 10/2019 | Sugeno |
| 2020/0014027 | A1 | 1/2020 | Ha et al. |
| 2020/0014078 | A1 | 1/2020 | Ha et al. |
| 2020/0168884 | A1 * | 5/2020 | Wang ................ H01M 50/202 |
| 2020/0243823 | A1 | 7/2020 | Morita |
| 2020/0287180 | A1 * | 9/2020 | Chen ................ H01M 50/507 |
| 2020/0290933 | A1 | 9/2020 | Honda |
| 2020/0303701 | A1 | 9/2020 | Kim et al. |
| 2020/0350557 | A1 | 11/2020 | Ha et al. |
| 2020/0350566 | A1 | 11/2020 | Ha et al. |
| 2020/0350567 | A1 | 11/2020 | Ha et al. |
| 2020/0350568 | A1 | 11/2020 | Lee et al. |
| 2020/0350574 | A1 | 11/2020 | Ha et al. |
| 2020/0350580 | A1 | 11/2020 | Ha et al. |
| 2020/0350632 | A1 | 11/2020 | Ha et al. |
| 2020/0377690 | A1 * | 12/2020 | Ootsuki ............. H01M 50/124 |
| 2021/0013460 | A1 | 1/2021 | Ootsuki et al. |
| 2021/0163303 | A1 | 6/2021 | Evans et al. |
| 2021/0296625 | A1 | 9/2021 | Li et al. |
| 2021/0320337 | A1 | 10/2021 | Chen et al. |
| 2021/0328281 | A1 | 10/2021 | Chu et al. |
| 2021/0328304 | A1 * | 10/2021 | You ................ H01M 50/262 |
| 2022/0059902 | A1 | 2/2022 | Jiang et al. |
| 2022/0069411 | A1 | 3/2022 | Wakabayashi et al. |
| 2022/0140434 | A1 | 5/2022 | Yoshida et al. |
| 2022/0149477 | A1 | 5/2022 | Yoshida et al. |
| 2022/0149478 | A1 | 5/2022 | Egashira et al. |
| 2022/0263188 | A1 | 8/2022 | Wakabayashi et al. |

FOREIGN PATENT DOCUMENTS

| | | | |
|---|---|---|---|
| CN | 106654462 A | 5/2017 | |
| CN | 106785225 A | 5/2017 | |
| CN | 206564279 U | 10/2017 | |
| CN | 206584999 U | 10/2017 | |
| CN | 206834290 U | 1/2018 | |
| CN | 107887550 A | 4/2018 | |
| CN | 207199806 U | 4/2018 | |
| CN | 207474524 U | 6/2018 | |
| CN | 207977389 U | 10/2018 | |
| CN | 109273803 A | 1/2019 | |
| CN | 109585726 A | 4/2019 | |
| EP | 3386003 A1 | 10/2018 | |
| EP | 3591737 A1 | 1/2020 | |
| EP | 3866233 A1 * | 8/2021 | ............ A62C 3/16 |
| JP | 2014135234 A | 7/2014 | |
| JP | 2016-110881 A | 6/2016 | |
| JP | 6245038 B2 | 12/2017 | |
| JP | 6390062 B2 | 9/2018 | |
| JP | 2019-213332 A | 12/2019 | |
| KR | 10-1067627 B1 | 9/2011 | |
| KR | 10-2012-0049020 A | 5/2012 | |
| KR | 10-2012-0119407 A | 10/2012 | |
| KR | 10-2014-0127743 A | 11/2014 | |
| KR | 10-2016-0021325 A | 2/2016 | |
| KR | 10-2016-0146349 A | 12/2016 | |
| KR | 10-2019-0023917 A | 3/2019 | |
| WO | WO 2013/006796 A1 | 1/2013 | |
| WO | WO 2019/117485 A1 | 6/2019 | |
| WO | WO 2020/203646 A1 | 10/2020 | |

OTHER PUBLICATIONS

Notice of Allowance for U.S. Appl. No. 16/901,474 dated Dec. 13, 2022, 10 pages.

(56) References Cited

OTHER PUBLICATIONS

Notice of Allowance for U.S. Appl. No. 16/901,538 dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
U.S. Final Office Action dated Apr. 13, 2023, issued in U.S. Appl. No. 17/014,970 (43 pages).
U.S. Office Action dated Feb. 24, 2023, issued in U.S. Appl. No. 16/901,527 (26 pages).
U.S. Notice of Allowance dated Mar. 7, 2023, issued in U.S. Appl. No. 17/014,089 (11 pages).
U.S. Final Office Action dated Mar. 13, 2023, issued in U.S. Appl. No. 16/901,522 (13 pages).
U.S. Final Office Action dated Mar. 13, 2023, issued in U.S. Appl. No. 17/014,853 (21 pages).
EPO Extended European Search Report dated Feb. 12, 2021, issued in corresponding European Patent Application No. 20194573.0 (9 pages).
Machine English Translation of CN207199806U, 3 pages.
PubChem Compound Summary for Vermiculite, retrieved on Apr. 5, 2022 from the Internet: https://pubchem.ncbi.nlm.nih.gov/compound/156593754 (Year: 2022).
U.S. Advisory Action from U.S. Appl. No. 16/844,914, dated Jan. 20, 2022, 4 pages.
U.S. Notice of Allowance from U.S. Appl. No. 16/901,547, dated Jul. 23, 2021, 8 pages.
U.S. Office Action from U.S. Appl. No. 16/901,474, dated Apr. 25, 2022, 37 pages.
U.S. Office Action from U.S. Appl. No. 16/901,527, dated Apr. 11, 2022, 24 pages.
Machine Translation of: CN 109585726 A, Cao et al., Apr. 5, 2019.
U.S. Office Action dated Aug. 19, 2021, issued in U.S. Appl. No. 16/844,914 (18 pages).
U.S. Final Office Action dated Nov. 9, 2021, issued in U.S. Appl. No. 16/844,914 (18 pages).
Advisory Action for U.S. Appl. No. 17/014,970 dated Sep. 9, 2022, 3 pages.
Chinese Office Action for CN Application No. 202010920922.X dated Jul. 6, 2022, 13 pages.
Chinese Office Action for CN Application No. 202010921351.1 dated Jul. 5, 2022, 9 pages.
Chinese Office Action for CN Application No. 202010921939.7 dated Aug. 1, 2022, 9 pages.
Final Office Action for U.S. Appl. No. 16/844,914 dated Jul. 20, 2022, 8 pages.
Final Office Action for U.S. Appl. No. 16/901,527 dated Oct. 4, 2022, 22 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 17/014,900 dated Aug. 30, 2022, 8 pages.
Notice of Allowance for U.S. Appl. No. 17/014,976 dated Oct. 19, 2022, 8 pages.
Notice of Allowance for U.S. Appl. No. 16/901,541 dated Jul. 27, 2022, 8 pages.
Notice of Allowance for U.S. Appl. No. 17/014,976 dated Aug. 16, 2022, 9 pages.
Office Action for U.S. Appl. No. 16/901,474 dated Aug. 17, 2022, 22 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,853 dated Oct. 4, 2022, 25 pages.
Office Action for U.S. Appl. No. 17/014,970 dated Oct. 5, 2022, 38 pages.
Collins Online Dictionary entry for "space", accessed at https://www.collinsdictionary.com/us/dictionary/english/space on May 18, 2022 (Year: 2022).
Google define feature utilizing Oxford Languages Dictionary for "space", accessed at google.com on May 18, 2022 (Year: 2022).
U.S. Office Action from U.S. Appl. No. 16/901,522, dated May 27, 2022, 24 pages.
U.S. Notice of Allowance from U.S. Appl. No. 16/901,541, dated Jun. 1, 2022, 8 pages.
U.S. Office Action from U.S. Appl. No. 17/014,034, dated May 25, 2022, 38 pages.
U.S. Office Action from U.S. Appl. No. 17/014,853, dated May 31, 2022, 24 pages.
Advisory Action for U.S. Appl. No. 16/901,474 dated Jul. 7, 2022, 4 pages.
Final Office Action for U.S. Appl. No. 17/014,970 dated Jun. 24, 2022, 38 pages.
Final Office Action for U.S. Appl. No. 17/014,976 dated Jun. 7, 2022, 24 pages.
U.S. Office Action dated Jun. 30, 2023, issued in U.S. Appl. No. 17/014,853 (31 pages).
European Patent Office Extended Search Report, for Patent Application No. 20194611.8, dated Feb. 16, 2021, 9 pages.
European Patent Office Extended Search Report, for Patent Application No. 20194589.6, dated Mar. 5, 2021, 9 pages.
European Patent Office Extended Search Report, for Patent Application No. 20194607.6, dated Feb. 8, 2021, 10 pages.
European Patent Office Extended Search Report, for Patent Application No. 20194594.6, dated Feb. 10, 2021, 9 pages.
European Patent Office Extended Search Report, for Patent Application No. 20194592.0, dated Feb. 8, 2021, 9 pages.
European Patent Office Extended Search Report, for Patent Application No. 20194587.0, dated Feb. 16, 2021, 10 pages.
"The Engineering Tool Box", https://www.engineeringtoolbox.com/density-materials-d_1652.html, Aug. 30, 2021 (Year: 2021), 16 pages.
U.S. Notice of Allowance from U.S. Appl. No. 16/901,538, dated Mar. 18, 2022, 8 pages.
U.S. Office Action from U.S. Appl. No. 16/844,914, dated Mar. 17, 2022, 24 pages.
U.S. Office Action from U.S. Appl. No. 16/901,474, dated Oct. 20, 2021, 21 pages.
U.S. Office Action from U.S. Appl. No. 16/901,522, dated Dec. 13, 2021, 40 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,034, dated Dec. 13, 2021, 40 pages.
U.S. Office Action from U.S. Appl. No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,970, dated Mar. 2, 2022, 38 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.

(56) References Cited

OTHER PUBLICATIONS

U.S. Restriction Requirement from U.S. Appl. No. 17/014,970, dated Oct. 22, 2021, 6 pages.
US Office Action dated Aug. 30, 2023, issued in U.S. Appl. No. 17/014,970 (22 pages).
Chinese Office Action for CN Application No. 202010919375.3 dated Dec. 20, 2023 (with English translation), 19 pages.
Chinese Office Action for CN Application No. 202010919377 dated Dec. 20, 2023 (with English translation), 21 pages.
Final Rejection for U.S. Appl. No. 17/014,853 dated Jan. 9, 2024, 37 pages.
US Office Action dated Apr. 4, 2024, issued in U.S. Appl. No. 17/014,853 (32 pages).
Korean Office Action dated Aug. 7, 2024, issued in Korean Patent Application No. 10-2020-0113361, 5 pages.
Korean Office Action dated Aug. 7, 2024, issued in Korean Patent Application No. 10-2020-0113374, 5 pages.
Korean Office Action dated Aug. 7, 2024, issued in Korean Patent Application No. 10-2020-0113360, 5 pages.
Korean Office Action dated Aug. 7, 2024, issued in Korean Patent Application No. 10-2020-0113373, 5 pages.
Korean Office Action dated Aug. 7, 2024, issued in Korean Patent Application No. KR 10-2020-0113358, 5 pages.
Korean Office Action dated Aug. 7, 2024, issued in Korean Patent Application No. 10-2020-0113371, 6 pages.
Korean Office Action dated Aug. 7, 2024, issued in Korean Patent Application No. 10-2020-0113363, 5 pages.
Korean Office Action dated Aug. 7, 2024, issued in Korean Patent Application No. 10-2020-0113376, 5 pages.
Korean Office Action dated Aug. 7, 2024, issued in Korean Patent Application No. 10-2020-0113377, 6 pages.
US Office Action dated Aug. 12, 2024, issued in U.S. Appl. No. 18/531,462 (28 pages).
US Office Action dated Sep. 29, 2024, issued in U.S. Appl. No. 17/564,152 (27 pages).
US Office Action dated Sep. 30, 2024, issued in U.S. Appl. No. 17/563,964 (15 pages).
US Final Office Action dated Dec. 18, 2024, issued in U.S. Appl. No. 18/531,462 (30 pages).
US Office Action dated Dec. 19, 2024, issued in U.S. Appl. No. 18/641,219 (35 pages).
US Final Office Action dated Feb. 25, 2025, issued in U.S. Appl. No. 17/563,964 (13 pages).

\* cited by examiner

Blocking Electrode Cell (Symmetrical)

Anode(15.5mmφ) + spacer(500um)
PE separator(19mmφ)(612HS)

spacer(500um)
Anode(15.5mmφ)

spring × 3

EL: 50uL (1MLiBF4 inPC)

Partially blocking pores through melt-down function

Completely blocking pores->Preventing Li movement

ENERGY STORAGE MODULE

CROSS-REFERENCE TO RELATED APPLICATIONS

This application claims priority to and the benefit of Korean Patent Application Nos. 10-2019-0110362 and 10-2020-0113372, filed on Sep. 5, 2019 and Sep. 4, 2020, respectively, in the Korean Intellectual Property Office, the contents of both of which are hereby incorporated by reference in their entirety.

BACKGROUND

1. Field

Aspects of embodiments of the present disclosure relate to an energy storage module.

2. Description of the Related Art

An energy storage module, which includes multiple battery cells, generally exhibits high-capacity and high-output characteristics. The energy storage module may be linked to a renewable energy and power system, such as, for example, a solar cell, to store electric power when demand for electric power from a load is low and to use (or discharge or provide) the stored electric power when demand for electric power is high.

The energy storage module generally includes (or is) an apparatus including a relatively large quantity of battery cells (e.g., secondary batteries or secondary battery cells). The battery cells are generally received (or accommodated) in multiple trays, which are received (or accommodated) in a rack, and multiple racks are received (or accommodated) in a container box.

However, there have recently been instances in which a fire occurs in energy storage modules. And, once a fire starts in an energy storage module, it is not easy to extinguish due to the characteristics of the energy storage module. Thus, research into technology to increase the safety of the energy storage module is being actively conducted.

SUMMARY

Embodiments of the present disclosure are related to an energy storage module exhibiting a reduced fire risk and increased safety by reducing or minimizing the chance of a fire spreading to adjacent cells when a fire occurs.

These and other aspects and features of the present disclosure will be described in or will be apparent from the following description of exemplary embodiments of the present disclosure.

According to an aspect of the present disclosure, an energy storage module includes: a cover member accommodating a plurality of battery cells in an internal receiving space, each of the battery cells including a vent; a top plate coupled to a top of the cover member and including a duct corresponding to the vent of at least one of the battery cells; a top cover coupled to a top of the top plate and having an exhaust area corresponding to the duct, the exhaust area having a plurality of discharge openings, the top cover including a protrusion protruding from a bottom surface of the top cover, the protrusion extending around a periphery of the exhaust area and around a distal end of the duct; and an extinguisher sheet between the top cover and the top plate, the extinguisher sheet being configured to emit a fire extinguishing agent at a reference temperature.

The top cover may further include an inclined surface having a gradually increasing thickness from the exhaust area to the protrusion.

A distal end of the duct may be arranged under the inclined surface.

The duct has a smaller cross-sectional area than the protrusion such that a space is between the duct and the protrusion such that some of the gas emitted from the vent passes through the duct and into the space along the inclined surface.

An inner diameter of the duct may decrease along an upward direction away from the battery cell.

A portion of the exhaust area of the top cover may extend over the duct.

The exhaust area of the top cover may have a smaller thickness than another area of the top cover adjacent the exhaust area.

The exhaust area may be recessed downwardly from other areas of the top cover.

An overall area of the discharge openings in the exhaust area may be greater than 30% of an overall area of the exhaust area.

The energy storage module may further include insulation spacers respectively positioned between adjacent ones of the battery cells, and the top plate may include openings respectively corresponding to the insulation spacers.

The extinguisher sheet may be offset from the duct and the protrusion.

The protrusion may contact the bottom surface of the top cover.

A distance between a bottom surface of the protrusion and the battery cells may be smaller than a distance between an upper surface of the duct and the battery cells.

A system may include: the energy storage module of claim 1; and a rack including a frame and shelves. The energy storage module may be accommodated on one of the shelves, and a distance between the top cover of the energy storage module and another one of the shelves above the energy storage module may be in a range of 3 mm to 7 mm.

The system may further include a plurality of the energy storage modules, and at least one of the energy storage modules may be on each of the shelves of the rack.

Each of the battery cells may include: a negative electrode including a negative electrode current collector, a negative electrode active material layer on the negative electrode current collector, and a negative electrode function layer on the negative electrode active material layer; and a positive electrode including a positive electrode current collector and a positive electrode active material layer on the positive electrode current collector. The negative electrode function layer may include flake-shaped polyethylene particles, and the positive electrode active material layer may include a first positive electrode active material including at least one composite oxide of lithium and a metal selected from the group consisting of cobalt (Co), manganese (Mn), nickel (Ni) and a combination of these metals, and a second positive electrode active material including a compound represented by the Chemical Formula (1):

$$\text{LiaFe}_{1-x}\text{M}_x\text{PO}_4 \tag{1}$$

wherein $0.90 \leq a \leq 1.8$, $0 \leq x \leq 0.7$, and M is Mn, Co, Ni or combinations thereof.

The flake-shaped polyethylene particles may have an average particle diameter (D50) in a range from 1 μm to 8 μm.

The energy storage module of claim 16, wherein the flake-shaped polyethylene particles may have an average particle diameter (D50) in a range from 2 μm to 6 μm.

The flake-shaped polyethylene particles may have a thickness in a range from 0.2 μm to 4 μm.

The energy storage module of claim 16, wherein the first positive electrode active material and the second positive electrode active material are contained in a weight ratio in a range from 97:3 to 80:20.

As described above, the energy storage module according to embodiments of the present disclosure suppresses ignition by providing a shut-down function to a battery cell by using compositions of negative and positive electrode active materials and can prevent or reduce heat from spreading to adjacent cells by rapidly extinguishing and cooling the battery cells when a vent of a battery cell opens (or ruptures) and/or when a fire occurs.

DETAILED DESCRIPTION

Figure 1:
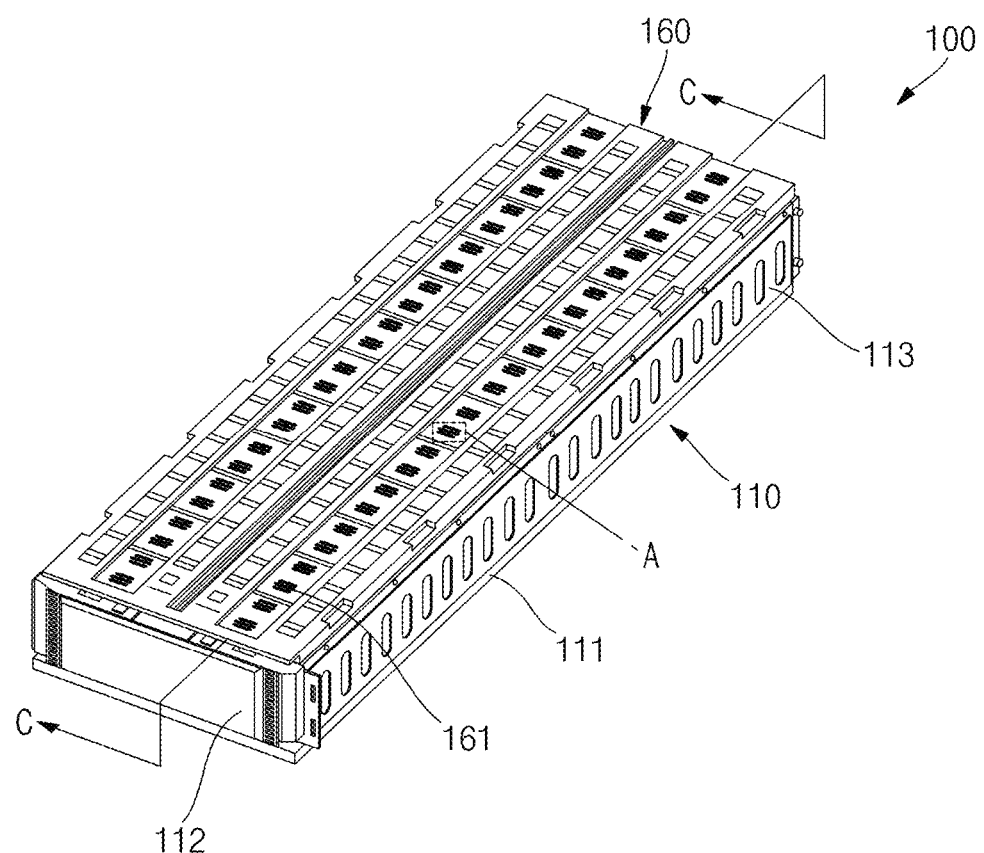
FIG. 1 is a perspective view of an energy storage module according to an embodiment of the present disclosure.

Hereinafter, embodiments of the present disclosure will be described in detail. The subject matter of the present disclosure may, however, be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components or layers may be exaggerated for brevity and clarity. Like numbers refer to like elements throughout. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing example embodiments of the present disclosure and is not intended to be limiting of the present disclosure. As used herein, the singular forms are intended to include the plural forms as well, unless the context clearly indicates otherwise.

Further, the use of "may" when describing embodiments of the present disclosure relates to "one or more embodiments of the present disclosure." Expressions, such as "at least one of," when preceding a list of elements, modify the entire list of elements and do not modify the individual elements of the list.

It will be further understood that the terms "comprise," "comprising," "include," "including," "has," and variations thereof, when used in this specification, specify the presence of the stated features, numbers, steps, operations, elements, and/or components but do not preclude the presence or addition of one or more other features, numbers, steps, operations, elements, components, and/or groups thereof. It will be understood that, although the terms first, second, etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the scope of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "over" or "above" the other elements or features. Thus, the exemplary term "below" can encompass both an orientation of above and below.

Hereinafter, a configuration of an energy storage module according to embodiments of the present disclosure will be described.

Figure 2:
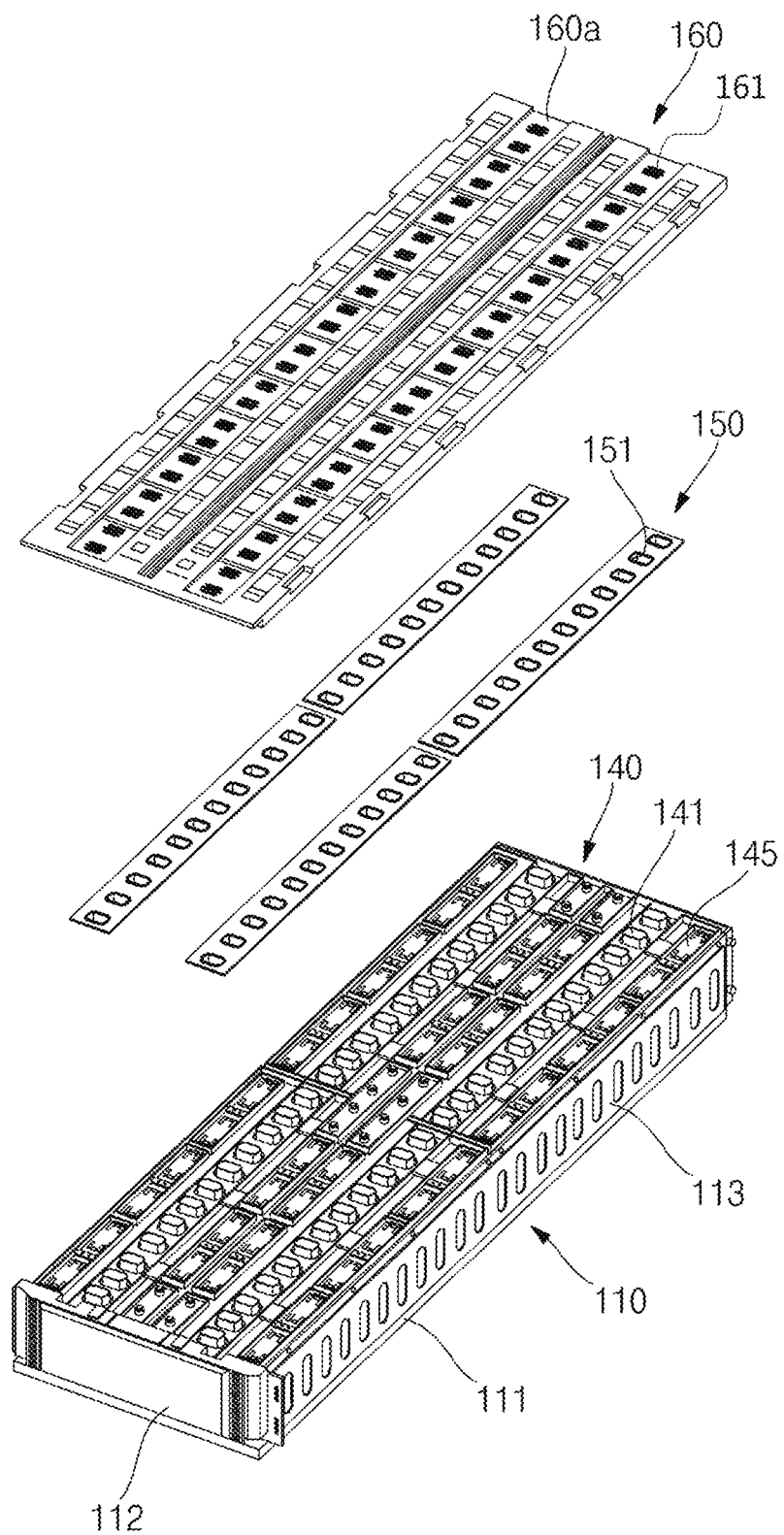
FIG. 2 is an exploded perspective view of the energy storage module shown in FIG. 1.
Figure 3:
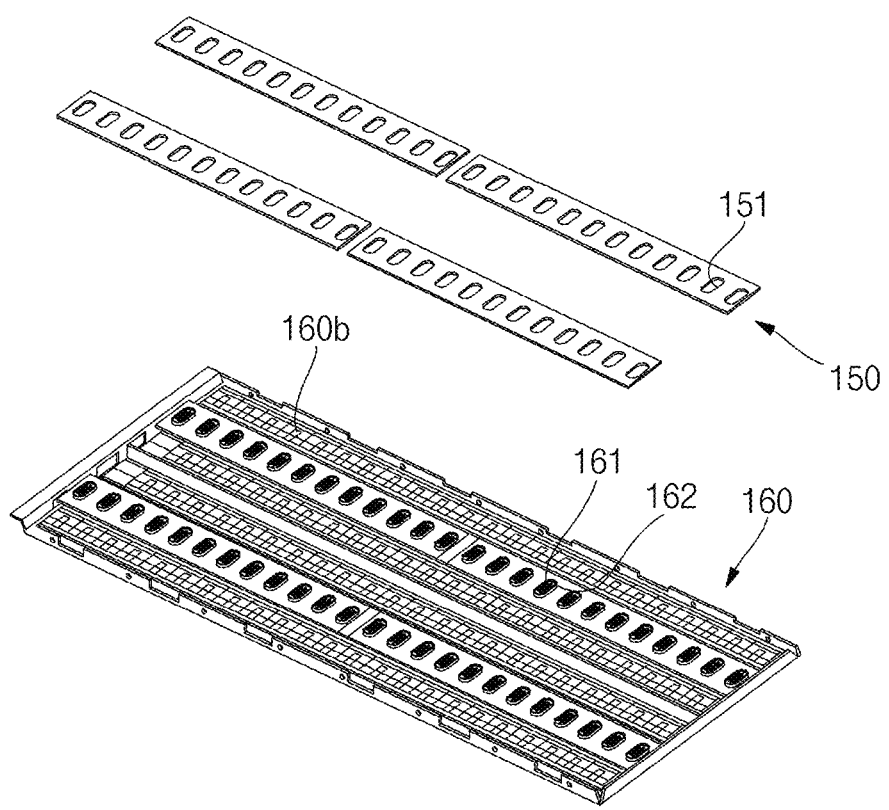
FIG. 3 is an exploded perspective view of a bottom of an extinguisher sheet and a top cover of the energy storage module shown in FIGS. 1 and 2.

FIG. 1 is a perspective view of an energy storage module according to an embodiment of the present disclosure, FIG. 2 is an exploded perspective view of the energy storage module shown in FIG. 1, FIG. 3 is an exploded perspective bottom view of a bottom surface of an extinguisher sheet and of a top cover of the energy storage module shown in FIGS. 1 and 2.

First, referring to FIGS. 1-3, the energy storage module 100 according to an embodiment of the present disclosure may include a cover member 110, a top plate (e.g., an upper plate) 140, an extinguisher sheet 150, and a top cover (e.g., an upper cover) 160.

The cover member 110 may provide an internal space for receiving (e.g., accommodating) battery cells 120 and insulation spacers 130. The cover member 110 includes a bottom plate 111, an end plate (or a plurality of end plates) 112, and a side plate (or a plurality of side plates) 113 which provide a space in which the battery cells and the insulation spacers are arranged, which will be further described below. In addition, the cover member 110 may fix positions of the battery cells and the insulation spacers and may protect the battery cells from external impacts.

The top plate 140 may be coupled to a top portion (e.g., a top or a top surface) of the cover member 110. The top plate 140 may be coupled to the cover member 110 while covering top portions (e.g., top surfaces) of the battery cells 120. In addition, positive electrode terminals 123 and negative electrode terminals 122 of the battery cells 120 are exposed to (e.g., face) the top plate 140 (e.g., are exposed to a top portion of the top plate 140), and bus bars 145 are coupled to the respective terminals 122/123, thereby connecting (e.g., electrically connecting) the battery cells 120 to one another in series, in parallel, or in series/parallel.

The top plate 140 includes a duct 141 corresponding to a vent 124a located on a top surface (e.g., in a cap plate 124 or cap assembly) of each battery cell 120. Accordingly, the gas discharged through the vent 124a of the battery cell 120 may move upwardly along (or through) the duct 141 of the top plate 140. The configuration and operation of the ducts 141 will be described in more detail below.

The extinguisher sheet 150 is positioned between the top plate 140 and the top cover 160. The extinguisher sheet 150 may be one or more members (or sheets) extending in one direction, for example, in a length direction, of the top plate 140. In addition, the extinguisher sheet 150 may include openings (e.g., an opening holes) 151 positioned to respectively correspond to the ducts 141 of the top plate 140. Accordingly, the extinguisher sheet 150 may be positioned such that the openings 151 therein correspond to the ducts 141 of the top plate 140. In addition, the extinguisher sheet 150 may be coupled to a bottom surface 160b of the top cover 160. Because the extinguisher sheet 150 is coupled to the bottom surface 160b of the top cover 160, the extinguisher sheet 150 may be positioned above the top plate 140. The configuration and operation of the extinguisher sheet 150 will be described in more detail below.

The top cover 160 is coupled to the top portion (e.g., the top surface or a top) of the top plate 140. The top cover 160 may cover the top plate 140 and the bus bars 145. In addition, the top cover 160 also covers the extinguisher sheet 150 coupled to its bottom surface 160b, thereby protecting the top plate 140, the bus bars 145, and the extinguisher sheet 150 from external impacts applied to a top surface 160a of the top cover 160.

The top cover 160 may include discharge openings (e.g., a discharge holes) 161 and protrusion parts (e.g., protrusions) 162 spaced apart from (e.g., spaced apart from by a distance or a predetermined distance) the outer periphery of the discharge openings 161. The protrusion parts 162 may protrude downwardly. Openings (e.g., opening holes) 151 in the extinguisher sheet 150 may respectively correspond to (e.g., may be respectively coupled to the exterior of) the protrusion parts 162, and the ducts 141 may respectively protrude into (e.g., may be respectively coupled to) the interior of the protrusion parts 162. Each of the discharge openings 161 may include a plurality of discharge openings (e.g., discharge openings or sub-discharge openings) arranged in one direction, for example, in a length direction, of the top cover 160. In addition, the discharge openings 161 may be positioned to correspond to the ducts 141 of the top plate 140. Accordingly, gas discharged from the vent 124a of a battery cell 120 may be discharged to the exterior through the corresponding duct 141 of the top plate 140 and the corresponding discharge opening 161 of the top cover 160. In addition, the discharge opening 161 of the top cover 160 may have a size that prevents (or mitigates a risk of) the user's hand contacting the internal components of the energy storage module 100.

In addition, as will be further described below, a plurality of energy storage modules 100 may be respectively accommodated on shelves in a rack. In an example, the rack may be configured such that a plurality of shelves are arranged adjacent each other upwardly and spaced apart from one another with at least one of the energy storage modules 100 being mounted on each of the shelves. In such an embodiment, a bottom surface of one of the energy storage modules 100 may contact a top surface of a shelf, and a bottom surface of another shelf may be on (or over) a top surface of the one of the energy storage modules 100.

Hereinafter, a coupling relationship between the ducts 141 of the top plate 140 and the top cover 160 in the energy storage module 100 according to an embodiment of the present disclosure will be described in greater detail.

Figure 4:
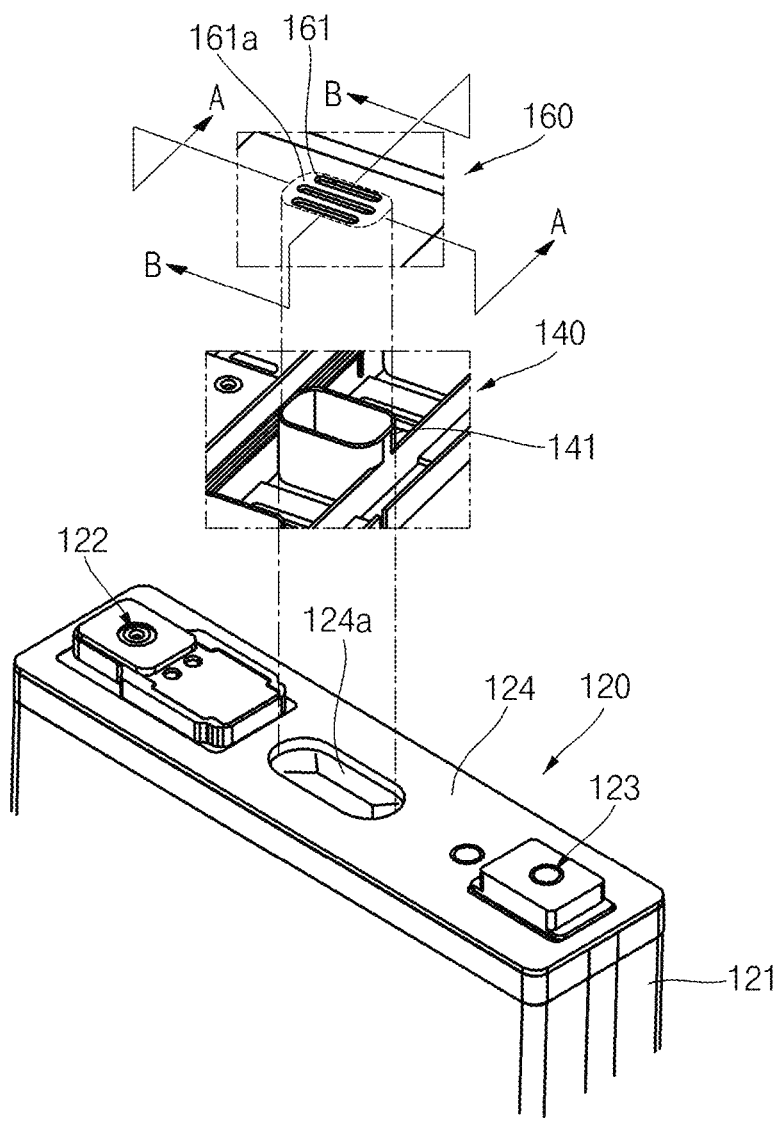
FIG. 4 is an exploded perspective view of a portion of a secondary battery, a top plate, and the top cover in the energy storage module shown in FIGS. 1-3.
Figure 5A:
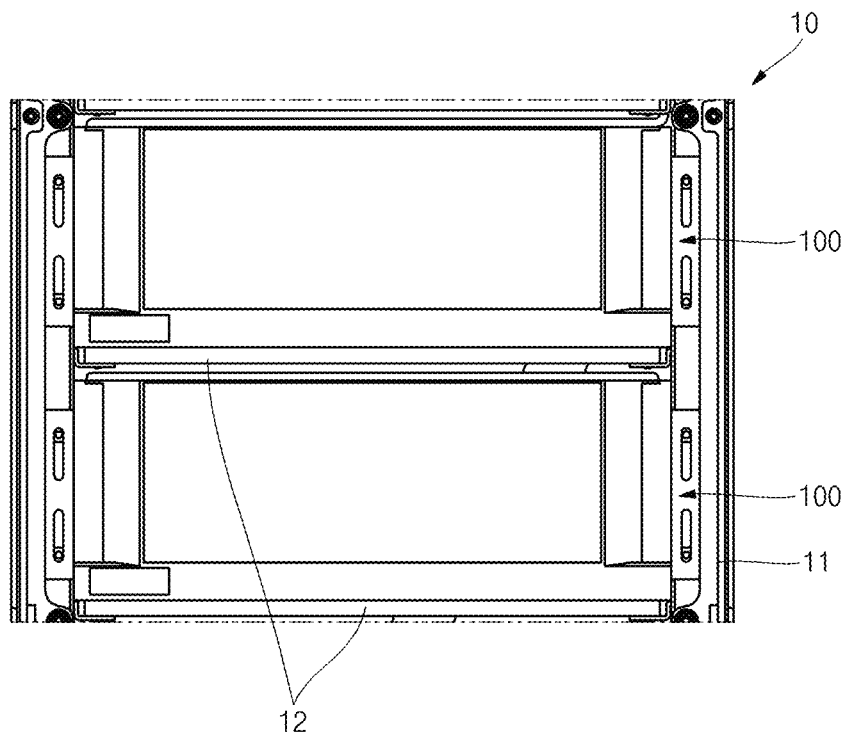
FIG. 5A shows a rack with a plurality of energy storage modules coupled thereto according to an embodiment of the present disclosure.
Figure 5B:
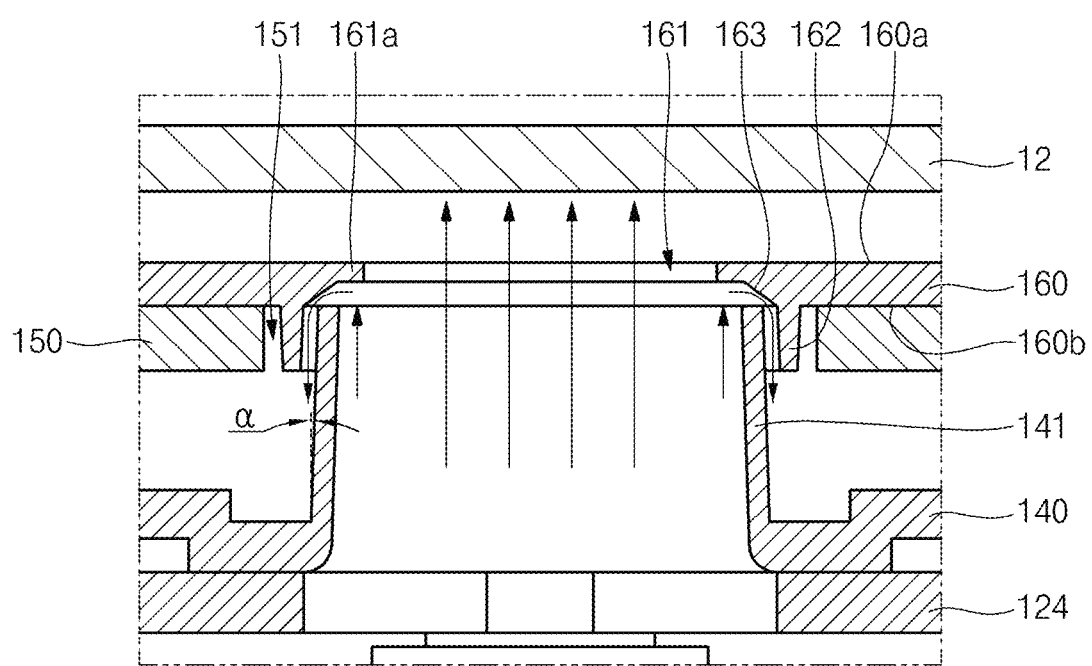
FIG. 5B is a cross-sectional view taken along the line A-A of FIG. 4.
Figure 5C:
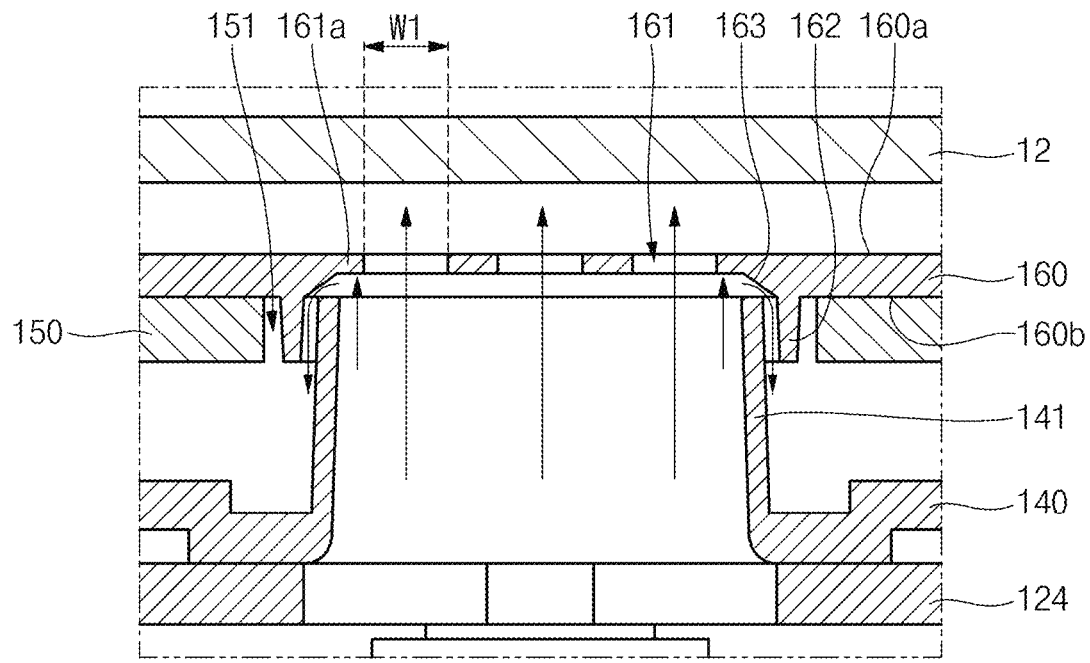
FIG. 5C is a cross-sectional view taken along the line B-B of FIG. 4.
Figure 5D:
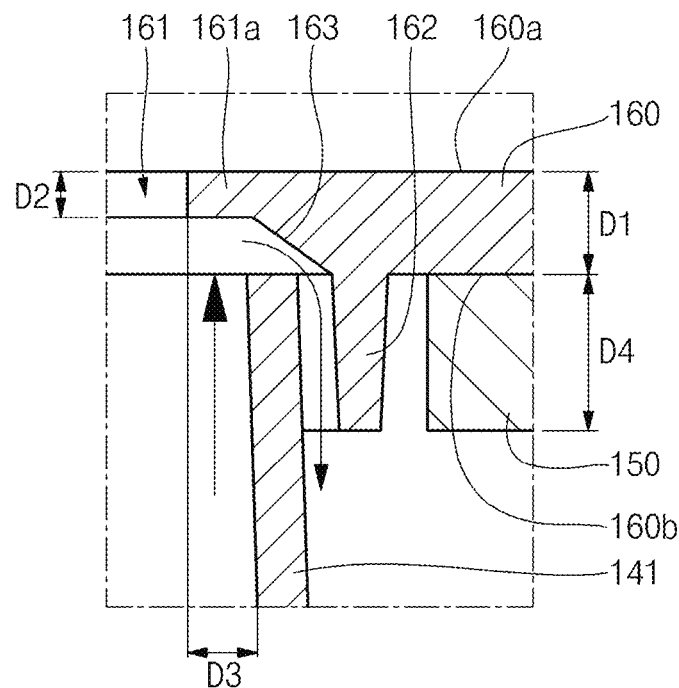
FIG. 5D is an enlarged view of a portion of FIG. 5B.
Figure 6:
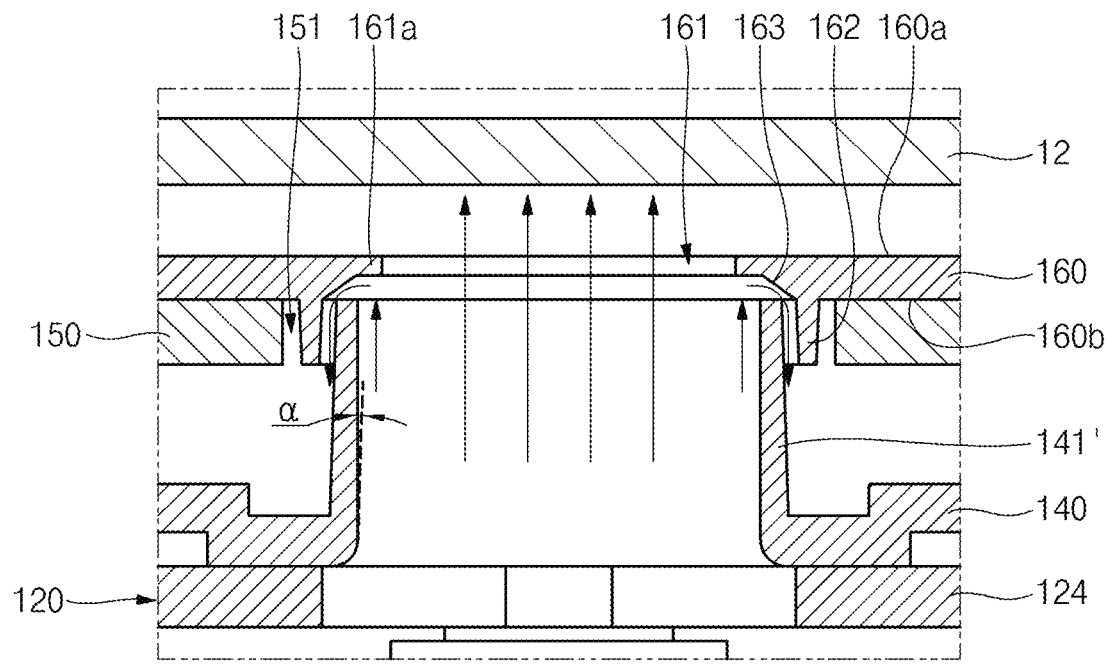
FIG. 6 is a cross-sectional view of a duct according to another embodiment of the present disclosure.

FIG. 4 is an exploded perspective view illustrating portions of a secondary battery cell 120, the top plate 140, and the top cover 160 in the energy storage module 100 according to an embodiment of the present disclosure. FIG. 5A partially illustrates a state in which an energy storage module according to an embodiment of the present disclosure is coupled to a rack, FIG. 5B is a cross-sectional view taken along the line A-A of FIG. 4, FIG. 5C is a cross-sectional view taken along the line B-B of FIG. 4, and FIG. 5D is a partially enlarged view of FIG. 5B. FIG. 6 is a cross-sectional view of a duct according to another embodiment of the present disclosure.

Referring to FIG. 4, the duct 141 of the top plate 140 is located to correspond to a vent 124a of a corresponding battery cell 120, and the discharge opening 161 of the top cover 160 is located to correspond to a top portion (e.g., a distal end or distal opening) of the duct 141.

The battery cell 120 includes an electrode assembly accommodated in a case 121 and a cap plate 124 covering a top portion (e.g., closing and sealing an opening) of the case 121. The electrode assembly may be configured by winding, stacking, or laminating a positive electrode plate and a negative electrode plate, each having a portion coated with an active material (e.g., a coating or coated portion), in a state in which a separator is positioned therebetween. In addition, the vent 124a in the cap plate 124 has a smaller thickness than other areas of the cap plate 124, and the vent 124a may be located approximately at the center of the cap plate 124. In addition, a first electrode terminal 122 and a second electrode terminal 123, which are electrically connected to the electrode assembly, may be located at opposite sides of the cap plate 124. In the following description, for the sake of convenience, the first electrode terminal 122 will be referred to as a negative electrode terminal, and the second electrode terminal 123 will be referred to as a positive electrode terminal, but the polarities thereof may be reversed. The chances of ignition (or combustion) can be reduced by selecting compositions of active materials of the battery cells 120, thereby increasing safety. The active material compositions will be described below.

The duct 141 acts as a passage through which gas discharged from the vent 124a of the battery cell 120 migrates, and the duct 141 protrudes from (e.g., from the top surface of) the top plate 140. In addition, the duct 141 may have a cross-sectional shape that corresponds to the vent 124a of the battery cell 120, for example, an elliptical shape. In addition, the duct 141 may have an upwardly decreasing inner diameter. For example, the duct 141 may have a constant (or substantially constant) thickness and may be upwardly inclined at an angle (e.g., a predetermined angle) (α) with respect to the interior surface of the duct 141. The angle (α) may be in a range from about 1° to about 5° and, in some embodiments, in a range from about 1° to about 3°, to allow the gas to be sufficiently discharged without obstructing the operation of the vent 124a of the battery cell 120.

To effectively exhaust the gas discharged from the vent 124a of the battery cell 120, the duct 141 may have a height corresponding to that of the top cover 160 (e.g., the duct 141 may have a height such that it reaches the top cover 160). For example, the height of the duct 141 may be in a range from about 15 mm to about 20 mm and, in some embodiments, from about 18 mm to about 18.4 mm, to reach the top cover 160. When the height of the duct 141 is greater than or equal to about 15 mm, the gas emitted from the vent 124a of the battery cell 120 may not return to the vent 124a even after the gas moves along the duct 141 and strikes the shelf 12. In addition, when the height of the duct 141 is less than or equal to about 20 mm, the duct 141 may be easily manufactured relative to the shelf 12. Because the duct 141 is positioned as high as the top cover 160 above the battery cells 120, the gas that has passed through the duct 141 can move directly to the corresponding discharge opening 161 located in the top cover 160.

As shown in FIG. 6, the duct 141' according to another embodiment of the present disclosure may have an upwardly increasing inner diameter. The duct 141' may have an upwardly decreasing thickness. For example, the interior surface of the duct 141' may be upwardly inclined at an angle (e.g., a predetermined angle) (α) with respect to the exterior surface of the duct 141', and the exterior of the duct 141' may be upwardly inclined at an angle (e.g., a predetermined angle) with respect to the interior surface of the duct 141'. The duct 141' may be inclined at an angle in a range from about 1° to about 5° and, in some embodiments, from about 1° to about 3°, which allows the gas to be sufficiently discharged without obstructing the operation of the vent 124a of the battery cell 120. When the inclination angle of the interior surface of the duct 141' is greater than or equal to about 1°, the gas emitted from the vent 124a of the battery cell 120 is easily concentrated upwardly. In addition, when the inclination angle of the interior surface of the duct 141' is less than or equal to about 5°, stiffness of the duct 141' may be maintained and the gas can move upwardly without being restricted by the duct 141'.

Referring to FIGS. 5B-5D, the top cover 160 may include an exhaust area 161a at where the discharge openings 161 are located, protrusion parts 162 located on the bottom surface 160b thereof, and an inclined part (e.g., an inclined surface) 163 located between corresponding ones of the exhaust areas 161a and ones of the protrusion parts 162. The exhaust area 161a may correspond to the duct 141 and may be defined as peripheral edges around the discharge openings 161. A thickness D2 of the exhaust area 161a may be smaller than a thickness D1 of the top cover 160 (D1>D2). For example, the thickness D2 of the exhaust area 161a may be equal to or less than two thirds (⅔) the thickness D1 of the top cover 160. In addition, the thickness D2 of the exhaust area 161a may be at least about 1.0 mm, which avoids any probable difficulty in injection molding the top cover 160 and minimizes or reduces flame generation when the gas is emitted from the battery cell 120. For example, when the thickness D1 of the top cover 160 is about 2.5 mm, the thickness D2 of the exhaust area 161a may be about 1.5 mm.

In addition, the gas emitted from the vent 124a of the battery cell 120 may be discharged through the discharge openings 161 in the exhaust area 161a. While three discharge openings 161 are shown in the illustrated embodiment, the number of discharge openings 161 is not limited thereto. However, the overall area occupied by the plurality of discharge openings 161 may be equal to or great than about 30% of the area of the exhaust area 161a to provide good ventilation performance. In addition, a width W1 of each of the discharge openings 161 may be smaller than about 3 mm. When the width W1 of the discharge opening 161 is less than or equal to about 3 mm, flames generated by the battery cell 120 may not spread outside of the top cover 160 and safety can be increased by preventing a user's hand from directly contacting the battery cell 120 from the exterior of the top cover 160.

The discharge openings 161 are positioned over (or above) the duct 141, and a top end of the duct 141 is covered by the exhaust area 161a. For example, as shown in FIG. 5C, a portion of the exhaust area 161a where the discharge openings 161 are not located may extend toward a center of the duct 141 (e.g., a peripheral portion of the exhaust area 161a may extend over a portion of the corresponding duct 141). In some embodiments, a distance (or length) D3 that the exhaust area 161a extends (or protrudes) over the interior of the duct 141 may be about 2 mm and, in some embodiments, in a range between about 1 mm and about 1.5 mm.

The protrusion part 162 may protrude from the bottom surface 160b of the top cover 160 and may be coupled to (or may extend around) the exterior of the duct 141. The protrusion part 162 may have a shape that corresponds to a cross-sectional shape of the duct 141 and may cover (or extend around a periphery of) the exhaust area 161a. In addition, the protrusion part 162 may have a larger cross-sectional area than the duct 141 such that a space exists between the duct 141 and the protrusion part 162. Some of the gas discharged from the vent 124a of the battery cell 120 may strike the exhaust area 161a positioned over the duct 141 and then move to the space between the duct 141 and the protrusion part 162. A distance between a bottom surface of the protrusion part 162 and the battery cell 120 may be smaller than a distance between an upper surface of the duct 141 and the battery cell 120. A height D4 of the protrusion part 162 from (e.g., measured from) the bottom surface 160b of the top cover 160 may be in a range from about 2 mm to about 4 mm and, in some embodiments, about 3 mm. If the height D4 of the protrusion part 162 is smaller than about 2 mm, the length of the protrusion part 162 protruding from the bottom surface 160b of the top cover 160 may not be long enough to guide the gas that collides with the exhaust area 161a to the exterior of the duct 141. If the height D4 of the protrusion part 162 is greater than about 4 mm, the length of the protrusion part 162 protruding from the bottom surface 160b of the top cover 160 may be excessively long, such that the gas may not be efficiently discharged. In addition, a ratio of the height D4 of the protrusion part 162 to the height of the duct 141 may be about 1:4 to about 1:9 and, in some embodiments, about 1:6. When the ratio of the height D4 of the protrusion part 162 to the height of the duct 141 is greater than about 1:4, the protrusion part 162 may be easily manufactured to cover the top portion of the duct 141. When the ratio of the height D4 of the protrusion part 162 to the height of the duct 141 is less than about 1:9, the gas that pass through the duct 141 may be easily guided upwardly.

The inclined part 163 is positioned between the exhaust area 161a and the protrusion part 162. In the top cover 160, the inclined part 163 is inclined (e.g., naturally inclined) by connecting the exhaust area 161a having a relatively small thickness and the protrusion part 162. For example, the inclined part 163 may be a portion of the top cover 160 that has a gradually increasing thickness from the exhaust area 161a a to the protrusion part 162. The top end of the duct 141 is positioned at a lower portion of (e.g., is positioned below) the inclined part 163. The inclined part 163 may prevent (or substantially reduce) the gas discharged from the vent 124a of the battery cell 120 from being redirected to the vent 124a. For example, some of the gas discharged from the vent 124a of the battery cell 120 may be directed to the exterior of the duct 141 along (or by) the inclined part 163 and the protrusion part 162 after colliding with the exhaust area 161a, which extends inwardly toward the interior of the duct 141, in the course of moving upwardly along the duct 141. Therefore, because the gas is not induced back to (e.g., are not directed back toward) the vent 124a of the battery cell 120, the safety of the energy storage module 100 is improved. The inclined part 163 may have a slope in a range from about 30° to about 60° with respect to the exterior surface of the duct 141 and, in some embodiments, in a range from 40° to 50°. When the angle of the inclined part 163 with respect to the exterior surface of the duct 141 is greater than about 30°, the gas discharged from the vent 124a is easily discharged to the exterior, thereby preventing (or substantially reducing) the discharged gas from being redirected toward the vent 124a. When the angle of the inclined part 163 with respect to the exterior surface of the duct 141 is less than about 60°, the inclined part 163 can be integrated with the protrusion part 162.

Referring to FIG. 5A, in another embodiment of the present disclosure, a plurality of the energy storage modules 100 may be mounted in a rack 10. The number of the energy storage modules 100 may vary according to the desired capacity, and the energy storage modules 100 may be mounted in the rack 10 and then fixed thereto. The rack 10 may include a frame 11 defining the overall external shape of the rack 10 and shelves 12 located at different layers of the frame 11 to support bottom portions of the energy storage modules 100. In FIG. 5A, two shelves 12 are illustrated in the frame 11 with energy storage modules 100 being respectively mounted on the shelves 12, but the present disclosure is not limited to these numbers of shelves 12 and energy storage modules 100.

As shown in FIGS. 5B-5D, if the vent 124a of the battery cell 120 ruptures, the gas may move upwardly along the duct 141, as indicated by the arrows. Although the vent 124a is shown as remaining in the cap plate 124 in FIGS. 5B and 5C, the vent 124a may rupture and then detach from the cap plate 124 when excessive internal gas is generated in the battery cell 120. In addition, some of the emitted gas may move along the inclined part 163 and the protrusion part 162 after colliding with the exhaust area 161a, which extends toward the center of the duct 141. In addition, the gas that has passed through the duct 141 may move toward the exterior through the discharge openings 161 of the top cover 160 positioned above the duct 141. Here, the gas may be between the top surface 160a of the top cover 160 and the shelf 12, with the shelf 12 supporting another energy storage module 100. Here, a distance between the top surface 160a of the top cover 160 and the shelf 12 may be in a range from about 3 mm to about 7 mm. When the distance is greater than or equal to about 3 mm, the heat generated from the energy storage module 100 can be easily discharged to the exterior. When the distance is less than or equal to about 7 mm, a high-temperature inert gas atmosphere can be easily created.

Specifically, when a gas begins to be discharged from a battery cell through a vent, a phase change may begin to occur in a fire extinguishing agent in the extinguisher sheet 150 at a temperature in a range from about 40° C. to about 60° C., and in some embodiments, a temperature in a range from 45° C. to 55° C. However, even in this case, the fire extinguishing agent may remain inside the extinguisher sheet 150 instead of being sprayed (released) therefrom. As the amount of gas discharged through the vent gradually increases and a temperature around the vent rises and reaches a temperature in a range from about 120° C. to about 200° C., for example, a temperature in a range from about 130° C. to 190° C., and as another example, a temperature in a range from 140° C. to 180° C., a gas containing an electrolytic steam may be generated mainly through the vent. The gas in the above temperature range may not melt a heat-resistant plastic constituting an upper plate 140 and an upper cover 160 (e.g., may allow the heat-resistant plastic to remain unmelted) and spraying of some of the fire extinguishing agent may begin. In addition, the inclined part 163 of the top cover 160 may prevent (or substantially mitigate) the low-temperature combustible gas from being redirected toward the vent 124*a*. If the separator melts as the internal temperature of the battery cell 120 rises, high-temperature inert gas may be generated along with flames. As described above, the inert gas may fill a space between the top cover 160 and the shelf 12 to create an inert gas atmosphere. In addition, the inert gas may also fill the internal space of the duct 141. The inert gas can prevent oxygen induction, which may prevent and block flame generation from the battery cell 120 to prevent (or substantially mitigate) the flames from propagating to a neighboring battery cell 120 or to another energy storage module 100. In addition, the extinguisher sheet 150 positioned under the top cover 160 may emit (e.g., spray) the fire extinguishing agent in response to the high-temperature inert gas, which will be further described below.

Hereinafter, the configuration and operation of the extinguisher sheet 150 of the energy storage module 100 according to an embodiment of the present disclosure will be described in more detail.

Figure 7A:
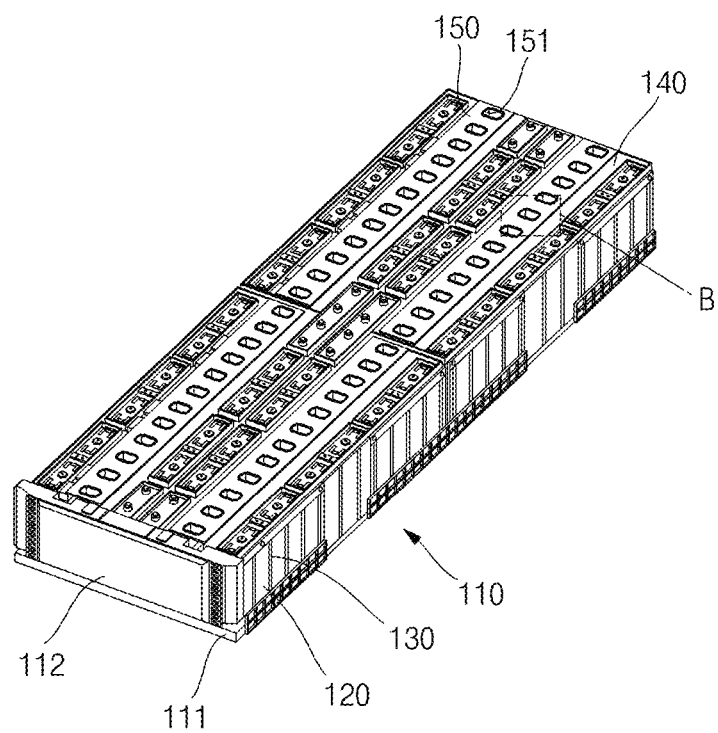
FIG. 7A is a perspective view of the extinguisher sheet coupled to the top plate of the energy storage module shown in FIGS. 1-4 according to an embodiment of the present disclosure.
Figure 7B:
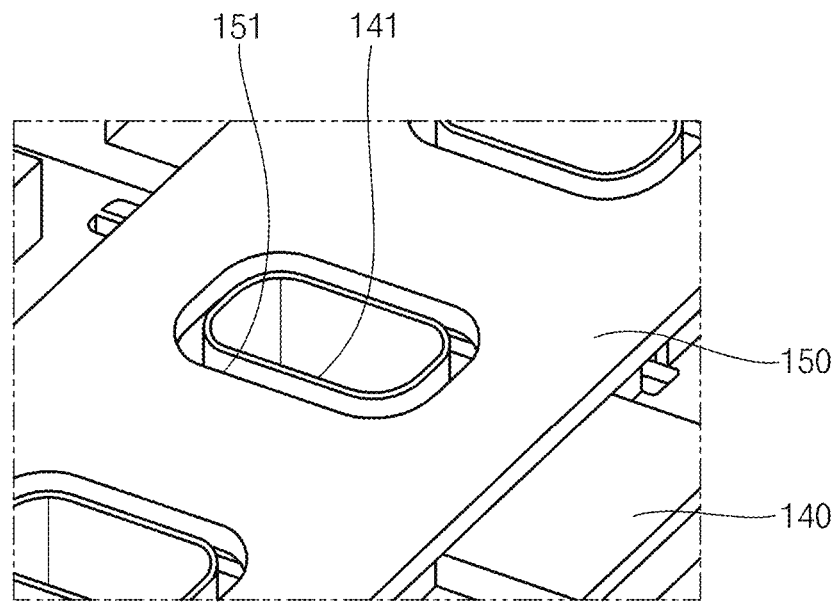
FIG. 7B is an enlarged view of the portion B of FIG. 7A.
Figure 8A:
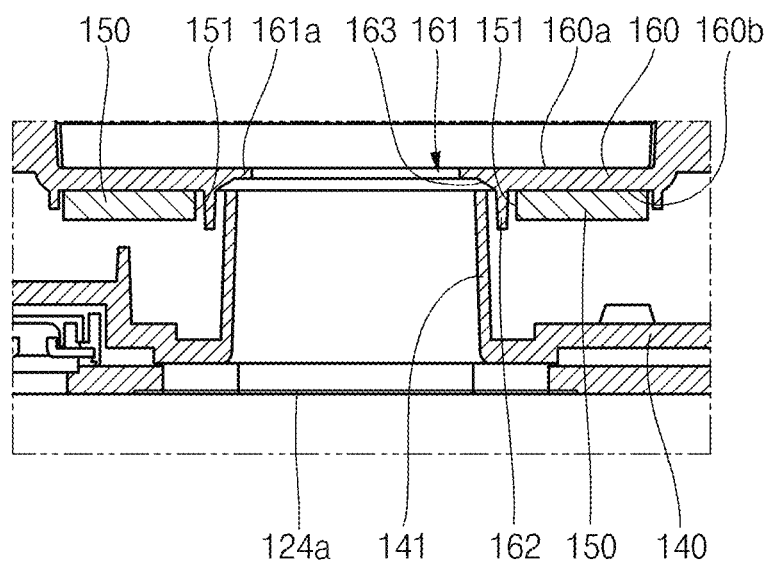
FIGS. 8A and 8B are conceptual diagrams illustrating a state in which an extinguisher sheet operates in the energy storage module according to an embodiment of the present disclosure.
Figure 8B:
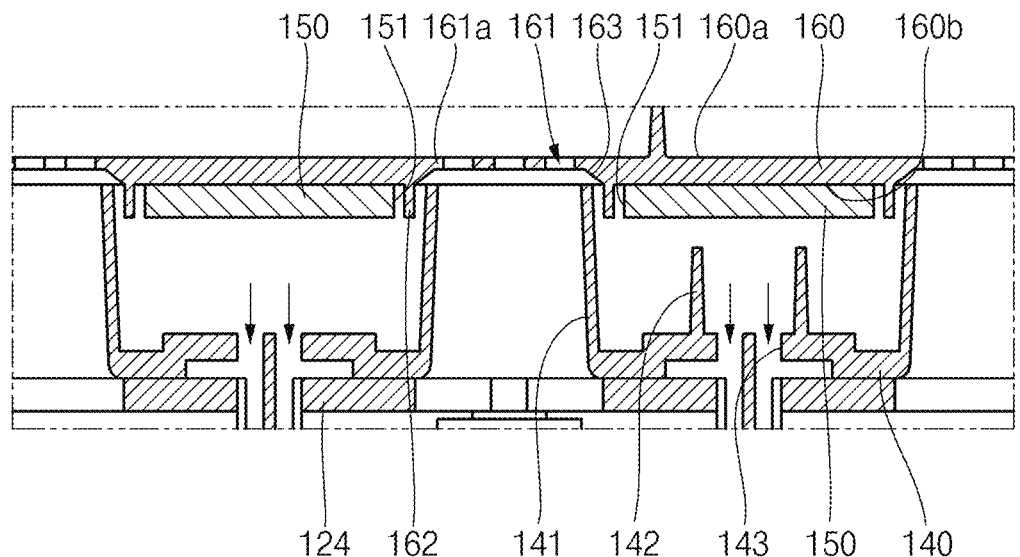

FIG. 7A is a perspective view of the extinguisher sheet 150 that is coupled to the top plate 140 of the energy storage module 100 according to an embodiment of the present disclosure, and FIG. 7B is an enlarged view of the portion B of FIG. 7A. FIGS. 8A and 8B are diagrams illustrating the operation of the extinguisher sheet 150 in the energy storage module 100 according to an embodiment of the present disclosure.

The extinguisher sheet 150 may be positioned between the top plate 140 and the top cover 160, as described above. As shown in FIGS. 7A and 7B, the extinguisher sheet 150 may have openings (e.g., opening holes) 151 respectively coupled to (e.g., extending around) the ducts 141 of the top plate 140. Accordingly, movement of the gas through the ducts 141 may not be influenced by (or substantially influenced by) the extinguisher sheet 150. The extinguisher sheet 150 may be offset from the ducts 141 and the protrusions 162.

In addition, referring to FIGS. 8A and 8B, the extinguisher sheet 150 may operate in response to (e.g., due to) heat when the inert gas having a relatively high temperature of about 200° C. is generated. Here, the fire extinguishing agent contained in the extinguisher sheet 150 is emitted (e.g., sprayed) from the extinguisher sheet 150 in response to the high-temperature gas. In addition, because a top portion (e.g., a top surface) of the extinguisher sheet 150 is covered by the top cover 160, the fire extinguishing agent may be sprayed toward the top plate 140 with directionality. In addition, the fire extinguishing agent may reach the underlying insulation spacers 130 through openings (e.g., opening holes) 143 of the top plate 140 located between ones of the ducts 141 of the top plate 140. In addition, a fluid guide protrusion 142 may be further provided around some or all of the openings 143 in the top plate 140, thereby more efficiently guiding the fire extinguishing agent. As will be described in more detail below, after reaching the insulation spacers 130, the fire extinguishing agent may move along surfaces of the insulation spacers 130, thereby extinguishing a battery cell 120 at where a fire has occurred and cooling the battery cell 120.

In addition, the extinguisher sheet 150 may include a capsule-type fire extinguishing agent accommodated in an external case. As described above, the extinguisher sheet 150 is configured to spray (or emit) the internal fire extinguishing agent. For example, the external case may open (e.g., may rupture) when the gas passing through the duct 141 of the top plate 140 reaches a relatively high temperature of about 200° C., thereby emitting the capsule-type fire extinguishing agent.

Hereinafter, the configuration and operation of the battery cells 120 and insulation spacers 130 of the energy storage module 100 according to an embodiment of the present disclosure will be described in more detail.

Figure 9:
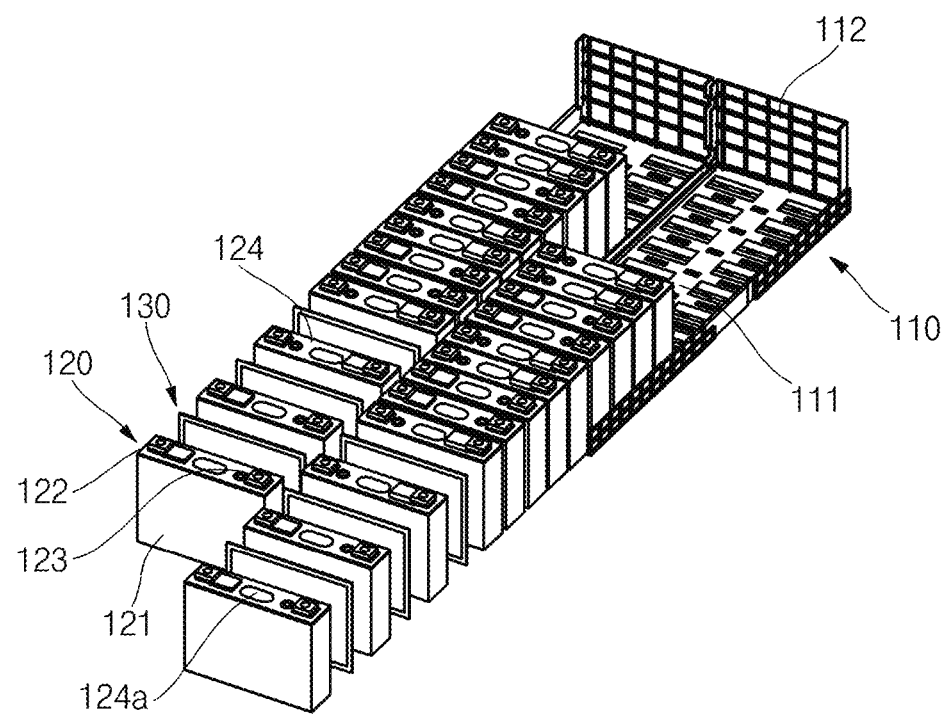
FIG. 9 shows battery cells and insulation spacers arranged on a bottom plate of the energy storage module according to an embodiment of the present disclosure.
Figure 10:
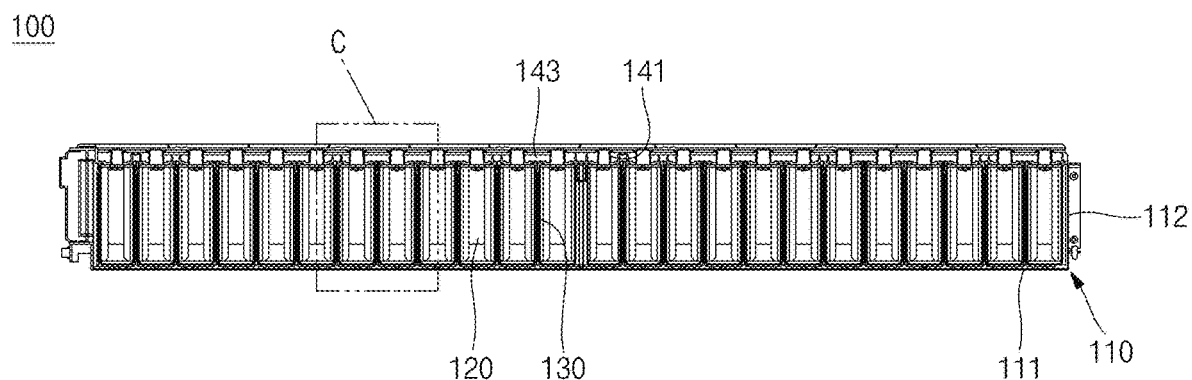
FIG. 10 is a cross-sectional view taken along the line C-C of FIG. 1.
Figure 11:
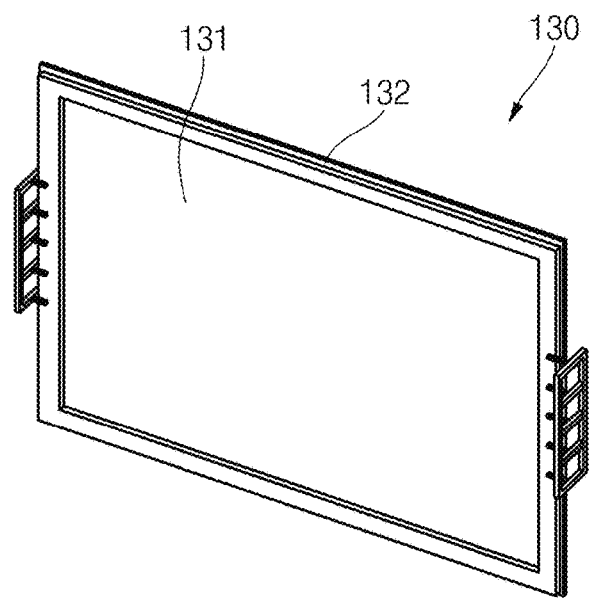
FIG. 11 is a perspective view of an insulation spacer according to an embodiment of the present disclosure.
Figure 12:
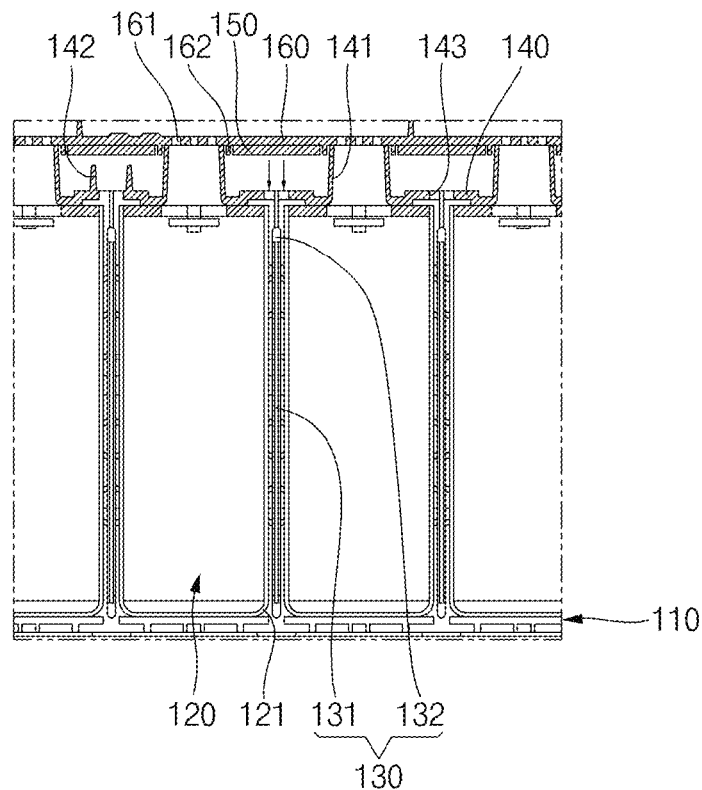
FIG. 12 is a partially enlarged view of the portion C of FIG. 10.

FIG. 9 illustrates a state in which battery cells 120 and insulation spacers 130 are arranged on a bottom plate 111 of an energy storage module 100 according to an embodiment of the present disclosure. FIG. 10 is a cross-sectional view taken along the line C-C of FIG. 1. FIG. 11 is a perspective view illustrating a configuration of an insulation spacer 130 according to an embodiment of the present disclosure. FIG. 12 is a partially enlarged view of the portion C of FIG. 10.

Referring to FIGS. 9 and 10, the battery cells 120 and insulation spacers 130 may be alternately arranged on a top surface of the bottom plate 111 of the cover member 110. The battery cells 120 may be arranged into a plurality of columns (e.g., two columns) on the top surface of the bottom plate 111, and the insulation spacers 130 may be respectively positioned between adjacent ones of the battery cells 120.

The insulation spacers 130 may prevent the battery cells 120 from contacting one another, thereby electrically insulating the battery cells 120 (e.g., electrically insulating the cases 121 of the battery cells 120). In addition, the insulation spacers 130 may establish passages for external air by maintaining a space between each of the battery cells 120, thereby cooling the battery cells 120.

As shown in FIG. 11, each of the insulation spacers 130 may include a sheet part (e.g., a sheet) 131 and an edge part (e.g., an edge) 132. The sheet part 131 may include a combination of a flame-retardant (or non-combustible) sheet that prevents (or substantially impedes) the fire from spreading to neighboring battery cells 120 when one or more of the battery cells 120 catch fire and a heat-insulating sheet that prevents (or substantially impedes) heat from spreading to neighboring battery cells 120. For example, the flame-retardant sheet may include (or may be formed of) mica (e.g., mica paper), and the heat-insulating sheet may include (or may be formed of) a ceramic paper, such as a bio-soluble fiber paper (BSFP), containing an alkaline earth metal, but aspects of the present disclosure are not limited thereto.

In addition, the edge part 132 may extend along peripheral edges of the sheet part 131. The edge part 132 may include (or may be made of) a plastic material and may be coupled to edges of the sheet part 131 by using a double injection process to fix the shape of the sheet part 131. The edge part 132 may include (or may be made of), for example, general polyethylene or polypropylene.

As described above, if the fire extinguishing agent is injected at top portions of the insulation spacers 130, the fire extinguishing agent may move downwardly along the surfaces of the sheet part 131. Therefore, the fire extinguishing agent may contact the cases 121 of the adjacent battery cells 120, thereby extinguishing any flames and cooling the battery cells 120. Hereinafter, movement of the fire extinguishing agent will be described in greater detail.

As shown in FIG. 12, the top plate 140 may further include the openings 143 located to correspond to (e.g., located above and open to) the insulation spacers 130. Accordingly, the fire extinguishing agent emitted from the extinguisher sheet 150 may pass (e.g., may pass through) the top plate 140 through the openings 143 of the top plate 140 to reach the insulation spacers 130. In addition, the fire extinguishing agent may move along surfaces of the insulation spacers 130 that face the cases 121 of the adjacent battery cells 120, thereby extinguishing and cooling the battery cells 120. The fire extinguishing agent may be sprayed from the extinguisher sheet 150 above one of the battery cells 120 having a temperature that is higher than a reference temperature (e.g., about 200° C.). Therefore, the fire extinguishing agent may be sprayed from above the battery cell 120 having the elevated temperature. In addition, because the fire extinguishing agent moves along the surfaces of the insulation spacers 130 positioned at front and rear sides of the corresponding battery cell 120, the battery cell 120 may be sufficiently cooled and any flames extinguished.

Hereinafter, an energy storage module according to another embodiment of the present disclosure will be described.

Figure 13:
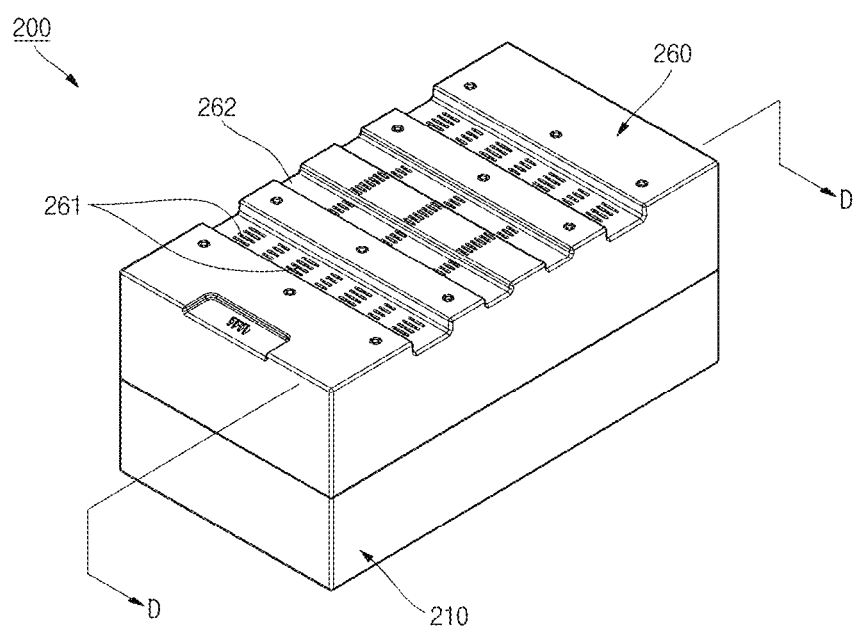
FIG. 13 is a perspective view of an energy storage module according to another embodiment of the present disclosure.
Figure 14:
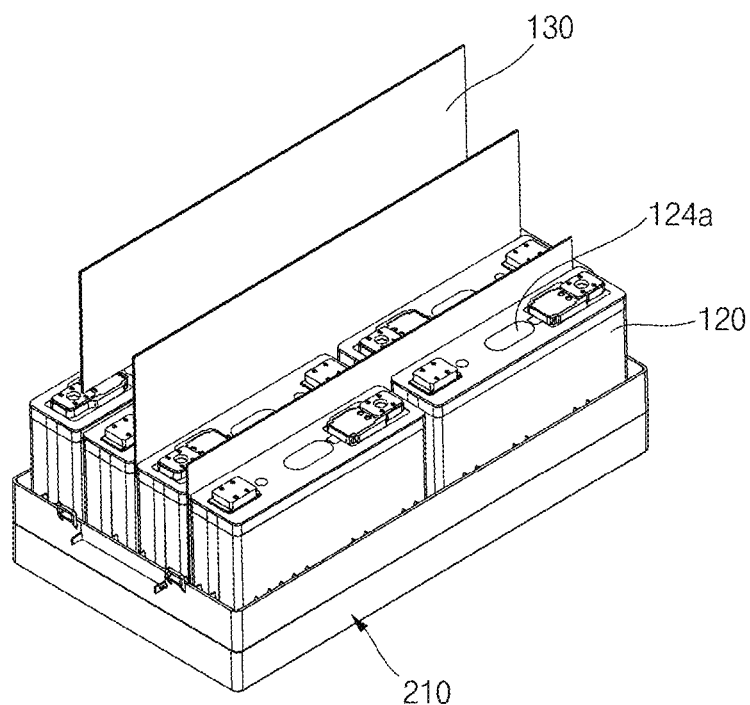
FIG. 14 is a perspective view of battery cells and insulation spacers mounted in a cover member in the energy storage module shown in FIG. 13.
Figure 15:
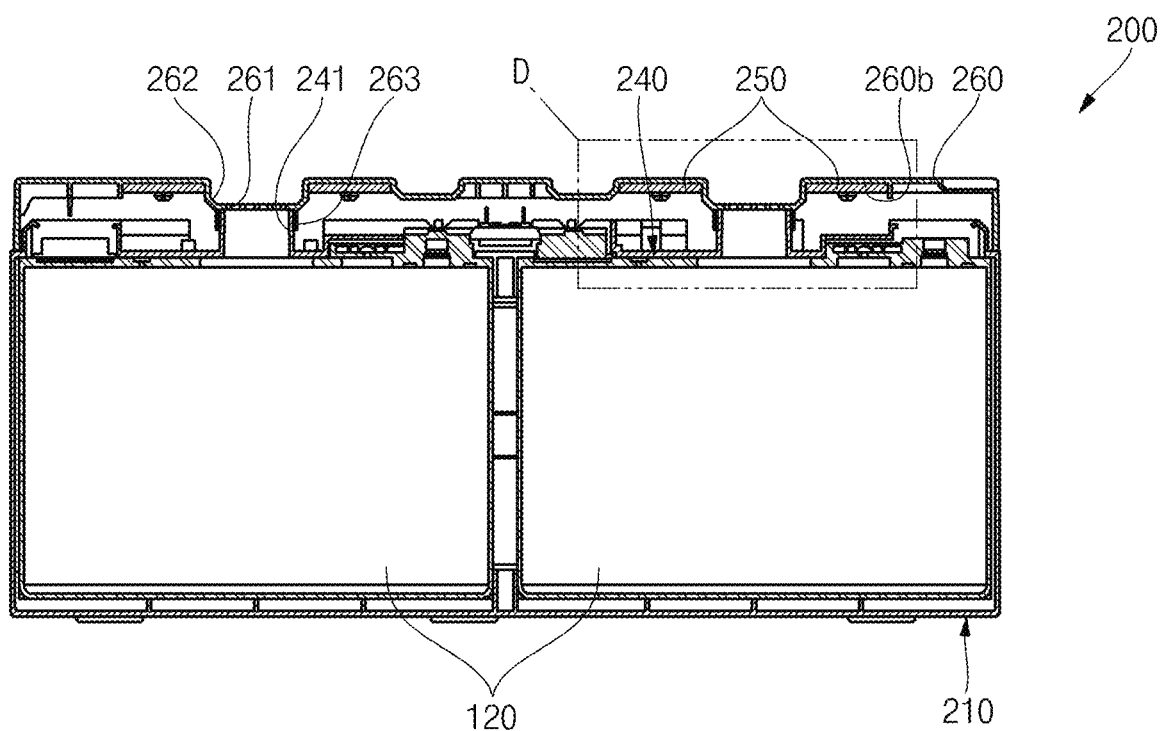
FIG. 15 is a cross-sectional view taken along the line D-D of FIG. 13.
Figure 16:
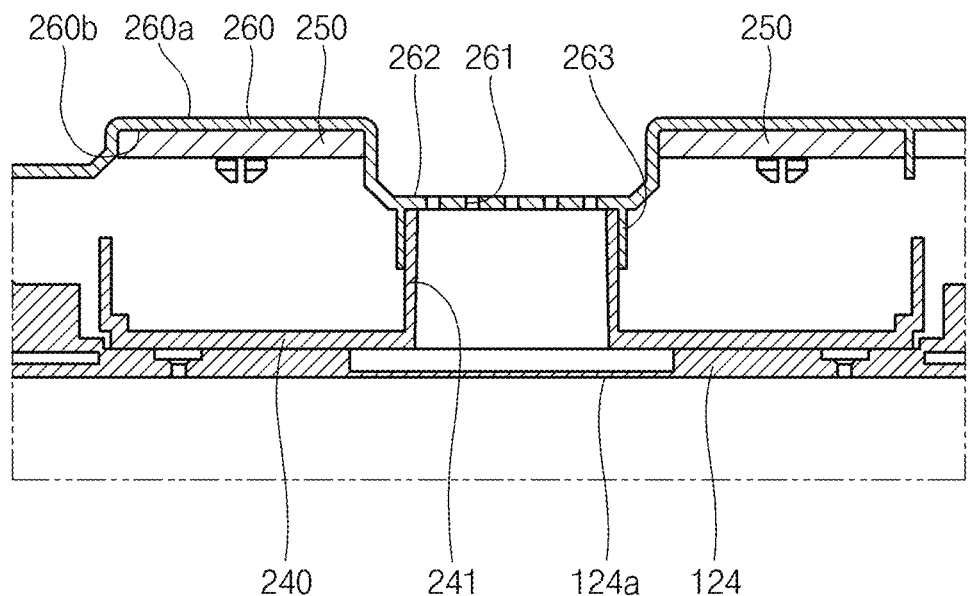
FIG. 16 is a partially enlarged view of the portion D of FIG. 15.

FIG. 13 is a perspective view of an energy storage module according to another embodiment of the present disclosure. FIG. 14 is a perspective view illustrating battery cells and insulation spacers mounted in a cover member of the energy storage module shown in FIG. 13. FIG. 15 is a cross-sectional view taken along the line D-D of FIG. 13. FIG. 16 is a partially enlarged view of a portion D of FIG. 15.

Referring to FIGS. 13-16, the energy storage module 200 according to another embodiment of the present disclosure may include a cover member 210, battery cells 120, insulation spacers 130, a top plate 240, an extinguisher sheet 250, and a top cover 260.

The energy storage module 200 may have a smaller volume than the energy storage module 100, described above. For example, fewer battery cells 120 may be accommodated in the space defined by the cover member 210, the top plate 240, and the top cover 260 of the energy storage module 200 than are accommodated in the energy storage module 100. The cover member 210, the top plate 240, and the top cover 260 may have suitable, varying sizes according to the number of battery cells 120 to be accommodated. However, the components of the energy storage module 200 may be similarly configured to those of the energy storage module 100.

The top plate 240 may be coupled to the cover member 210 and may cover top portions of the battery cells 120. The top plate 240 may include ducts 241 located to correspond to the vents 124a at a top surface of each of the battery cells 120. The ducts 241 may be arranged in (or aligned in) one direction, for example, in a length direction, of the top plate 240.

The extinguisher sheet 250 is positioned between the top plate 240 and the top cover 260. The extinguisher sheet 250 may be mounted on a bottom surface 260b of the top cover 260 and may include a plurality of planar sheets extending in a length direction at opposite sides of the ducts 241 of the top plate 240. Here, the length direction may refer to a direction in which the ducts 241 of the top plate 240 are aligned.

The top cover 260 is coupled to a top portion (e.g., a top surface) of the top plate 240. The top cover 260 may cover the top plate 240 and the extinguisher sheet 250, thereby protecting the top plate 240 and the extinguisher sheet 250 from impacts applied to a top surface 260a of the top cover 260. The top cover 260 may include an exhaust area 262 having a plurality discharge openings (e.g., discharge holes) 261 and a protrusion part 263 located on the bottom surface 260b thereof. The ducts 241 may be coupled to (e.g., may extend into) the interior of the protrusion part 263. The discharge openings 261 may each include a plurality of discharge openings (e.g., discharge sub-openings) arranged in one direction, for example, in a length direction, of the top cover 260. In addition, the discharge openings 261 may correspond to the ducts 241 of the top plate 240. Accordingly, gas discharged through the vents 124a of the battery cells 120 may be discharged to the exterior along the ducts 241 of the top plate 240 and the discharge openings 261 of the top cover 260.

In addition, the exhaust area 262 having the discharge openings 261 has a smaller height than (e.g., is lower than or recessed from) other areas of the top cover 260. For example, the exhaust area 262 downwardly protrudes toward the top plate 240 to provide a gas movement passage on the upper surface of the exhaust area 262. The exhaust area 262 is coupled to (e.g., is arranged above) a top portion (e.g., a distal end or distal opening) of the duct 241, and the protrusion part 263 protruding from a bottom surface of the exhaust area 262 is coupled to (e.g., extends around) the exterior of the duct 241. The duct 241 may be positioned below the top cover 260. With this configuration, the gas discharged through the duct 241 and the discharge openings 261 may gather in the gas movement passage located on (e.g., over) the exhaust area 262.

The gathered gas may be discharged to the exterior by using a separate fan or a suction device (e.g., a vacuum), thereby quickly discharging the gas generated by the battery cells 120 from the energy storage module 200.

Hereinafter, the active material composition of the battery cell 120 used in the energy storage module 100 according to an embodiment of the present disclosure will be described in greater detail.

Figure 17A:
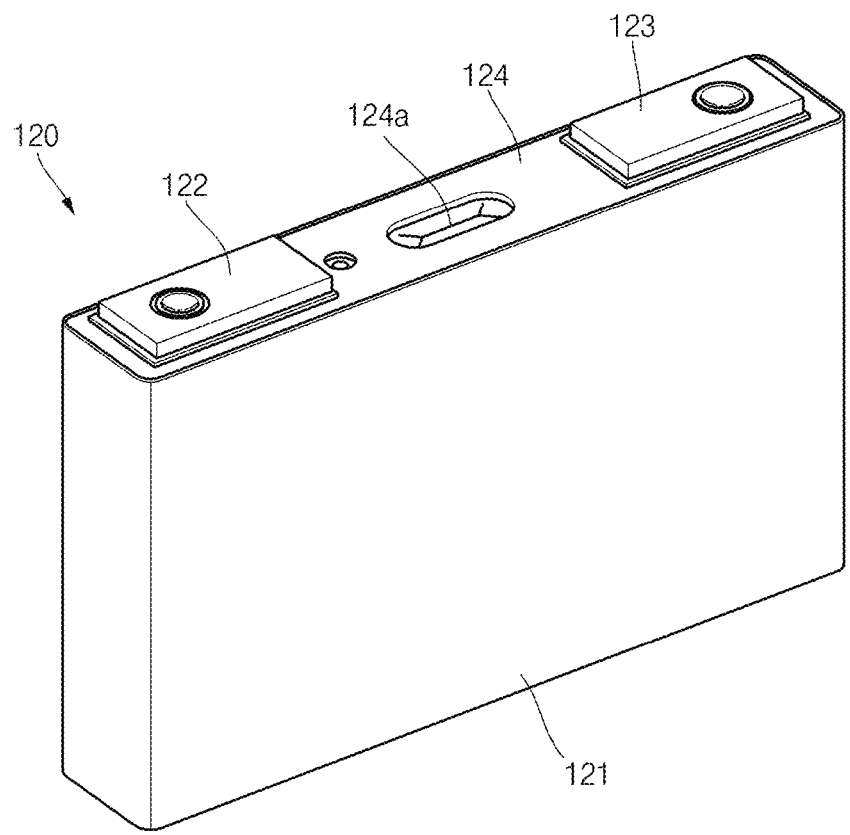
FIGS. 17A and 17B are a perspective view and a cross-sectional view, respectively, of a battery cell used in an energy storage module according to an embodiment of the present disclosure.
Figure 17B:
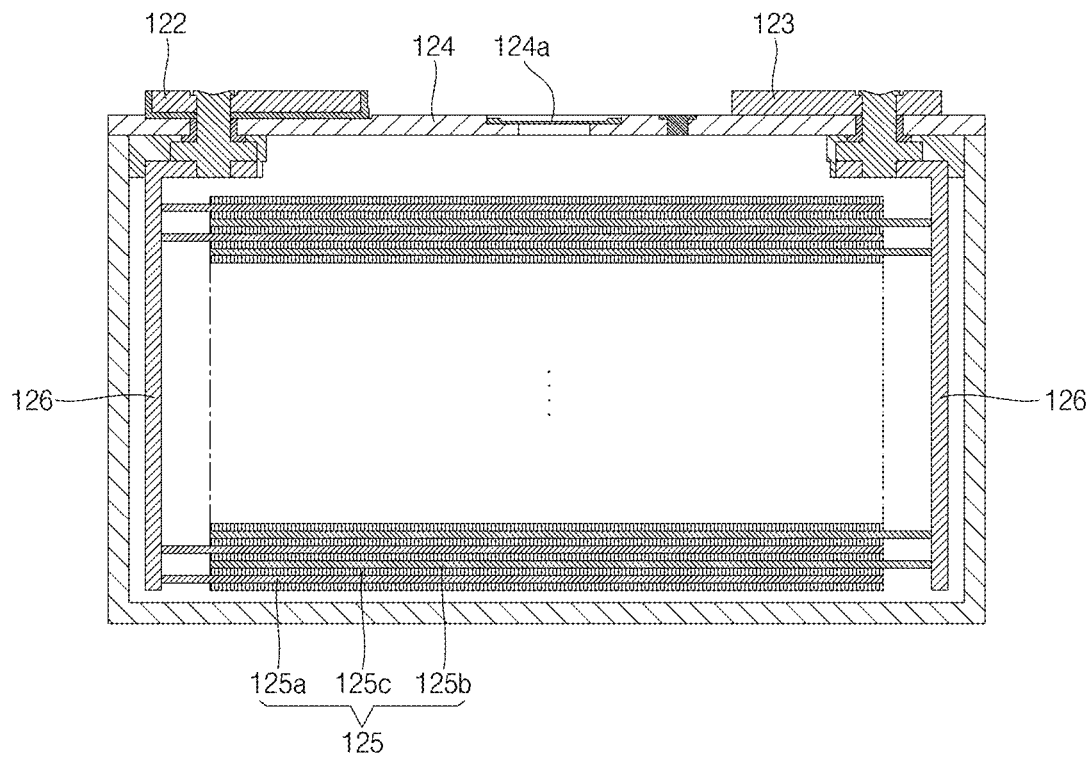

FIGS. 17A and 17B are a perspective view and a cross-sectional view of a battery cell used in an energy storage module according to an embodiment of the present disclosure.

Referring to FIGS. 17A and 17B, the battery cell 120 includes an electrode assembly 125 accommodated in a case 121 and a cap plate 124 covering a top portion of the case 121. In addition, a vent 124a having a smaller thickness than other regions of the cap plate 124 is located roughly at the center of the cap plate 124. One of the ducts 141 of the top plate 140 is located to correspond to the vent 124a, as described above.

In addition, the electrode assembly 125 may be electrically connected to a first electrode terminal 122 and a second electrode terminal 123 located on the cap plate 124 via current collectors 126. For convenience sake, in the following description, the first electrode terminal 122 will be referred to as a negative electrode terminal and the second electrode terminal 123 will be referred to as a positive electrode terminal, but polarities thereof may be reversed.

The electrode assembly 125 may include a negative electrode 125a, a positive electrode 125b positioned to face the negative electrode 125a, and a separator 125c positioned between the negative electrode 125a and the positive electrode 125b. The electrode assembly 125 may be accommodated in the case 121 together with an electrolyte.

Here, the negative electrode 125a may include a negative electrode current collector, a negative electrode active material layer positioned on the negative electrode current collector, and a negative electrode function layer positioned on the negative electrode active material layer.

Compared to a case where the negative electrode function layer includes spherical polyethylene particles, in a case where the negative electrode function layer includes flake-shaped polyethylene particles, the reaction depending on the temperature may speed up under the same reaction conditions, thereby further increasing a safety improving effect of a lithium secondary battery.

The flake-shaped polyethylene particles yet to be melted may be distributed to cover pores over a thinner and wider area than the spherical polyethylene particles yet to be melted. If the polyethylene particles are melted at a temperature higher than a set or predetermined temperature to shut down ion passages, a larger electrode plate area may be shut down by the flake-shaped polyethylene particles than by the melted spherical polyethylene particles, thereby increasing the reaction speed.

That is to say, during thermal runaway of a battery cell, the polyethylene particles included in the negative electrode function layer are melted to shut down ion passages, so that ion movement is restricted and a shut-down function is manifested, thereby preventing additional electrochemical reactions from taking place (or reducing a likelihood or degree of the additional electrochemical reactions).

Figure 20:
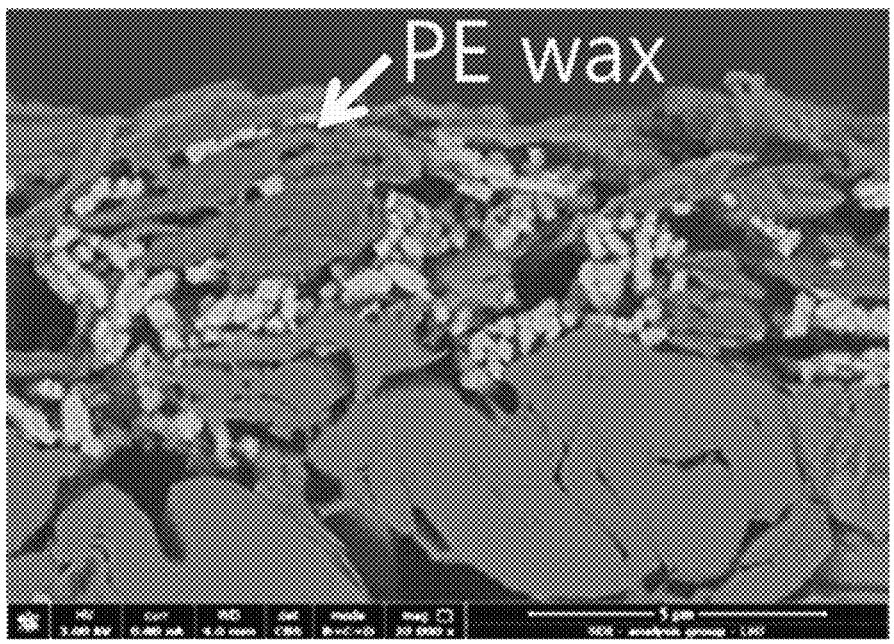
FIG. 20 is a SEM image of an electrode composition according to an embodiment of the present disclosure.
Figure 21:
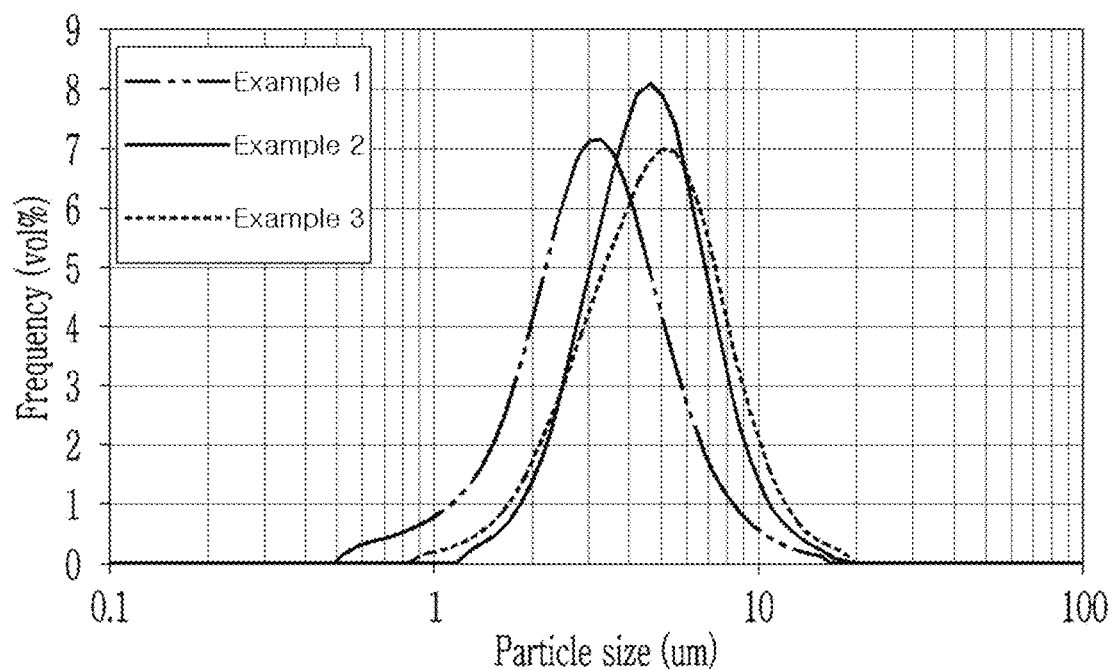
FIG. 21 is a graph showing particle size distribution analysis results of flake-shaped polyethylene particles contained in electrode compositions prepared according to Examples 1 to 3.

For example, as confirmed from FIG. 20, since the flake-shaped polyethylene particles according to an embodiment of the present disclosure are distributed over pores in the composition of the negative electrode function layer throughout a thin and wide area, they are quickly melted down during thermal runaway due to thermal/physical impacts, thereby demonstrating an excellent effect in blocking ion passages.

In general, polyethylene may be categorized by density into high-density polyethylene (HDPE) (Density: 0.94 g/cc to 0.965 g/cc), medium-density polyethylene (MDPE) (Density: 0.925 g/cc to 0.94 g/cc), low-density polyethylene (LDPE) (Density: 0.91 g/cc to 0.925 g/cc), and very low density polyethylene (VLDPE) (Density: 0.85 g/cc to 0.91 g/cc).

The flake-shaped polyethylene particles may be used alone or in mixture of two or more polyethylene (PE) polymers, such as, for example, HDPE, MDPE, or LDPE.

The flake-shaped polyethylene particles included in the negative electrode function layer positioned on the negative electrode active material layer may have an average particle diameter (D50) in a range from 1 µm to 8 µm, for example, from 2 µm to 6 µm.

Unless defined otherwise in the specification of the present disclosure, an average particle diameter (D50) may be measured using any suitable method generally used in the art such as, for example, by utilizing a particle size analyzer, or by utilizing a transmission electron microscopic (TEM) image or a scanning electron microscopic (SEM) image. Also, the D50 may be easily measured by analyzing data measured by a measuring device using a dynamic light-scattering method to count the number of particles for each particle size range and calculating an average value thereof. In some embodiments, the D50 value may correspond to a particle size at which half of the mass (or volume) of the particles have a larger particle size and the other half of the mass (or volume) of the particles have a smaller particle size.

Meanwhile, a ratio of a major axis length to a minor axis length of the flake-shaped polyethylene particles may be in a range from 1 to 5 (e.g., 1:1 to 5:1), for example, 1.1 to 4.5 (e.g., 1.1:1 to 4.5:1), or 1.2 to 3.5 (e.g., 1.2:1 to 3.5:1).

In addition, the flake-shaped polyethylene particles may have a thickness in a range from 0.2 µm to 4 µm, or 0.3 µm and 2.5 µm, for example, between 0.3 µm and 1.5 µm.

Figure 18:
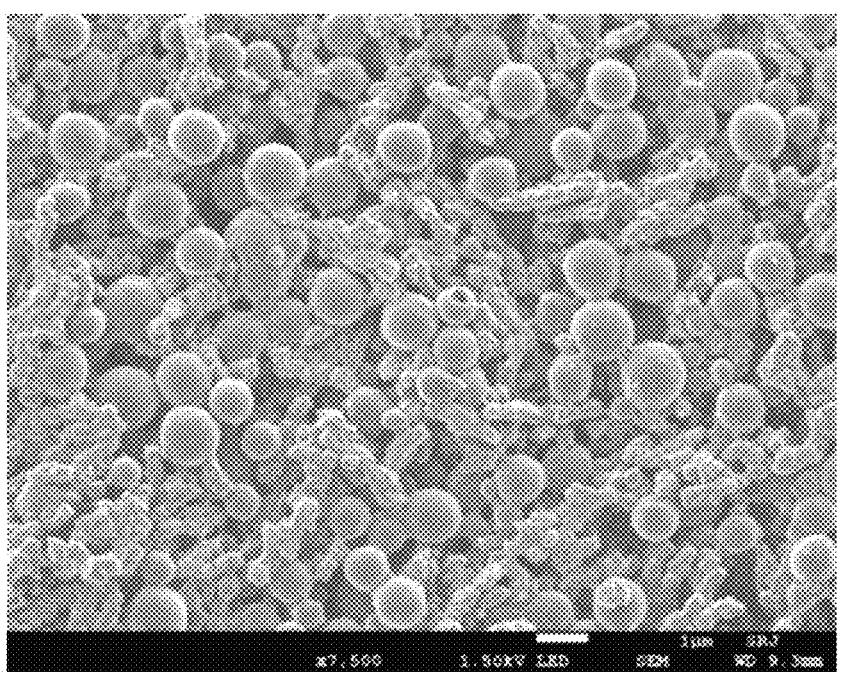
FIG. 18 is a scanning electron microscope (SEM) image of polyethylene spherical particles in an aqueous dispersion.
Figure 19:
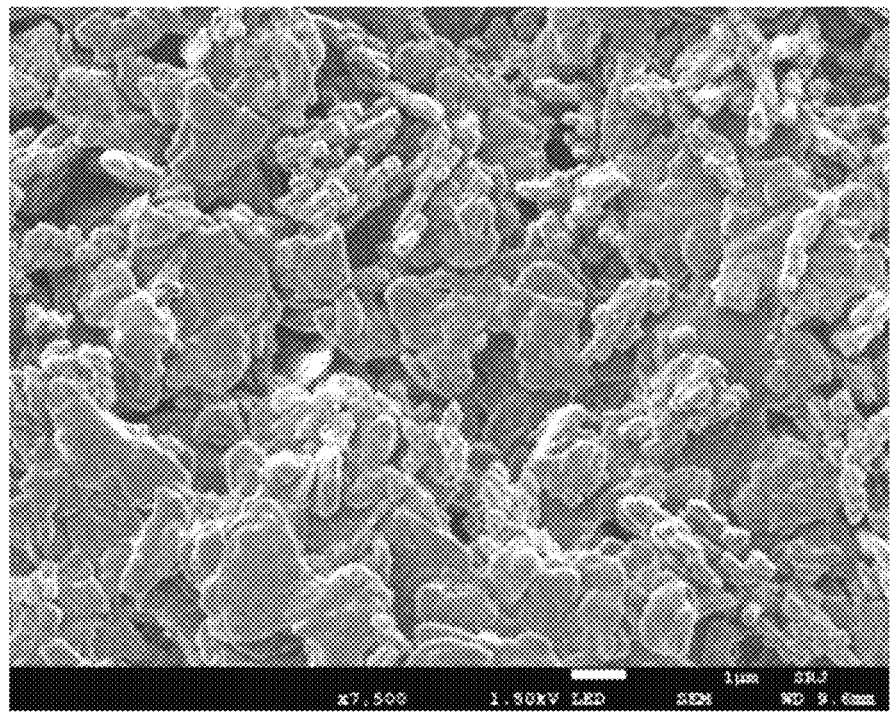
FIG. 19 is a SEM image of polyethylene spherical particles according to an embodiment of the present disclosure.

As shown in FIG. 19, the polyethylene particles according to the present disclosure have a flake-shape and have a different shape from general polyethylene particles having a spherical shape in a water-dispersible state, as shown in FIG. 18. An average particle size of the flake-shaped polyethylene particles may be defined to be D50, which is a particle size at 50% of a volume ratio (or a mass ratio) in a cumulative size-distribution curve.

The negative electrode function layer may further include inorganic particles and a binder.

The flake-shaped polyethylene particles and the inorganic particles and the binder may be contained in the negative electrode function layer in a weight ratio in a range from 80:20 to 99:1, specifically 85:15 to 97:3.

If the content (e.g., amount or weight ratio) of the flake-shaped polyethylene particles and the inorganic particles is within the range stated above, cycle-life characteristics and output power characteristics of rechargeable lithium battery cells including the same can be obtained or improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite or combinations thereof, but aspects of the present disclosure are not limited thereto. In addition to the inorganic particles, the negative electrode function layer may further include organic particles including an acryl compound, an imide compound, an amide compound or combinations thereof, but aspects of the present disclosure are not limited thereto.

The inorganic particles may have spherical shapes, sheet-shapes, cubic shapes or amorphous shapes. An average particle diameter (e.g., D50) of the inorganic particles may be in a range from about 1 nm to about 2500 nm. Within the range stated above, the average particle diameter of the inorganic particles may be in a range from about 100 nm to about 2000 nm, or between about 200 nm and about 1000 nm, for example, between about 300 nm and about 800 nm. The average particle diameter of the inorganic particles may be a particle size (D50) at 50% of a volume ratio (or a mass ratio) in a cumulative particle size-distribution curve.

The negative electrode function layer may have a thickness in a range from 1 µm to 10 µm, for example, between 3 µm and 10 µm.

A ratio of the thickness of the negative electrode active material layer to the thickness of the negative electrode function layer may be 50:1 to 10:1, specifically 30:1 to 10:1.

If the thickness of the negative electrode function layer is within the foregoing range, thermal stability of the resultant rechargeable lithium battery can be remarkably improved while maintaining excellent cycle life characteristics.

In some embodiments, if the thickness ratio of the negative active material layer to the negative electrode function layer is within the range stated above, thermal stability of the resultant rechargeable lithium battery can be improved while minimizing or reducing a reduction in the energy density.

Usable examples of the negative electrode current collector may include a copper foil, a nickel foil, a stainless steel foil, a titanium foil, a nickel foam, a copper foam, a polymer substrate coated with a conductive metal, or a combination thereof.

Usable examples of the negative electrode active material may include a material capable of reversibly intercalating/deintercalating lithium ions, a lithium metal, a lithium metal alloy, a material being capable of doping/undoping lithium, or a transition metal oxide.

Examples of the material capable of reversibly intercalating and deintercalating the lithium ions may include a carbon material, e.g., any suitable carbon-based negative electrode active material generally used in a lithium secondary battery. Representative examples of the carbon-based negative electrode active material may include crystalline carbon, amorphous carbon, and mixtures thereof. Examples of the crystalline carbon may include graphite, such as amorphous, sheet-shaped, flake-shaped, spherical-shaped, or fiber-shaped natural graphite or artificial graphite. Examples of the amorphous carbon may include soft carbon or hard carbon, a mesophase pitch carbonized product, fired coke, or the like.

Usable examples of the lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping/undoping lithium may include a silicon-based material, e.g., Si or $SiO_x$ (0<x<2), an Si-Q alloy (wherein the Q is an element selected from the group consisting of an alkali metal, an alkaline-earth metal, Group 13 to 16 elements, a transition metal, a rare earth element, or a combination thereof, and is not Si), a Si—C composite, Sn, $SnO_2$, Sn—R (wherein the R is an element selected from the group consisting of an alkali metal, an alkaline-earth metal, Group 13 to 16 elements, a transition metal, a rare earth element, or a combination thereof, and is not Sn), a Sn—C composite, and the like, and at least one of which may be used in a mixture with $SiO_2$. Usable examples of the elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The transition metal oxide may include a lithium titanium oxide.

In the negative electrode active material layer, the negative electrode active material may be included in an amount of 95 wt % to 99 wt % based on the total weight of the negative active material layer.

Optionally, the negative electrode active material layer may further include a negative electrode conductive material and a negative electrode binder.

Each of the negative electrode conductive material and the negative electrode binder may be included in an amount of 1 wt % to 5 wt % based on the total weight of the negative active material layer.

The negative electrode conductive material is used to improve the conductivity (e.g., electrical conductivity) of a negative electrode. Any suitable electrically conductive material may be used as the negative electrode conductive material, unless the material causes a chemical change (e.g., an undesirable or unwanted change to any of the components of rechargeable lithium battery). Examples of the negative electrode conductive material may include a carbon-based material, such as natural graphite, artificial graphite, carbon black, acetylene black, ketjen black, carbon fiber and the like; a metal-based material, such as a metal powder or a metal fiber and the like of copper, nickel, aluminum, silver, and the like; a conductive polymer, such as a polyphenylene derivative and the like; or a mixture thereof.

The negative electrode binder may serve to improve binding properties of the negative active material particles with one another and with a current collector. Examples of the negative electrode binder may include a non-water-soluble binder, a water-soluble binder, an amphiprotic binder, or a combination thereof.

Examples of the non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidenfluoride, polyethylene, polypropylene, polyamideimide, polyimide, or a combination thereof.

Examples of the water-soluble binder may include a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

Examples of the amphiprotic binder may include an acrylated styrene-based rubber.

When the water-soluble binder is used as the negative electrode binder, a cellulose-based compound may be further used to provide viscosity. Examples of the cellulose-based compound may include one or more of carboxylmethyl cellulose, hydroxypropylmethyl cellulose, methyl cellulose, or alkali metal salts thereof. The alkali metal may be Na, K, and/or Li. The cellulose-based compound may be included in an amount of 0.1 to 3 parts by weight based on 100 parts by weight of the negative electrode active material.

The positive electrode of the lithium secondary battery according to an embodiment of the present disclosure may include a positive electrode active material layer including a first positive electrode active material including at least one composite oxide of lithium and a metal of cobalt, manganese, nickel, or a combination thereof, and a second positive electrode active material including a compound represented by the Chemical Formula (1).

$$\text{LiaFe1-xMxPO4} \qquad (1)$$ 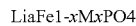

wherein 0.90≤a≤1.8, 0≤x≤0.7, and M is Mn, Co, Ni or combinations thereof.

Figure 25:
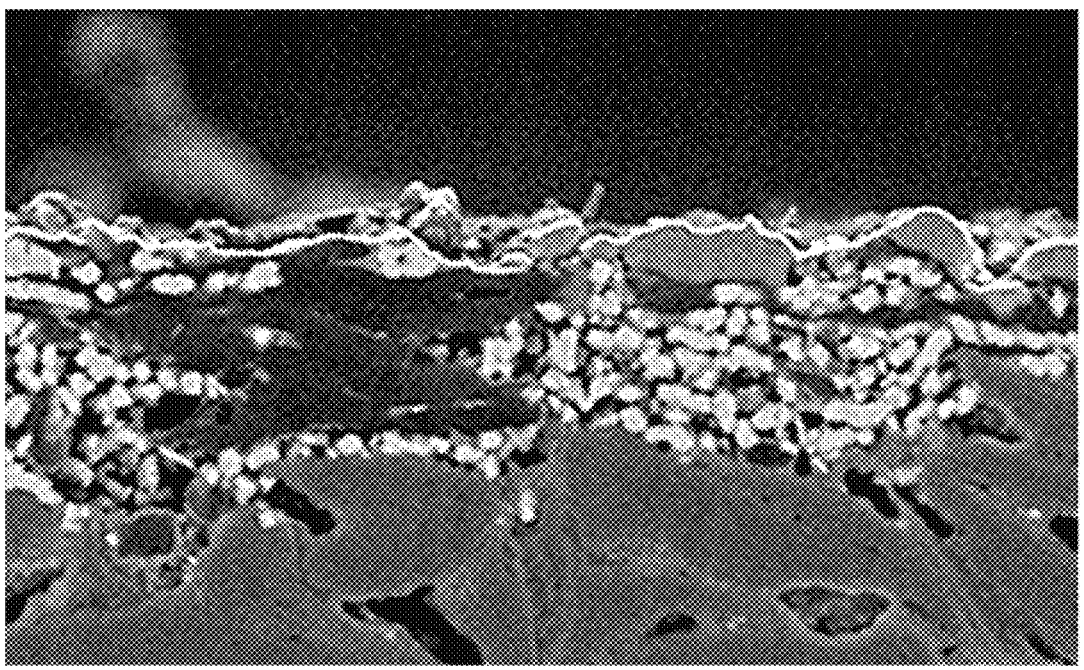
FIG. 25 is a SEM image showing a cross section of a surface of a negative electrode when a lithium secondary battery not including a positive electrode according to Example is shut down.
Figure 26:
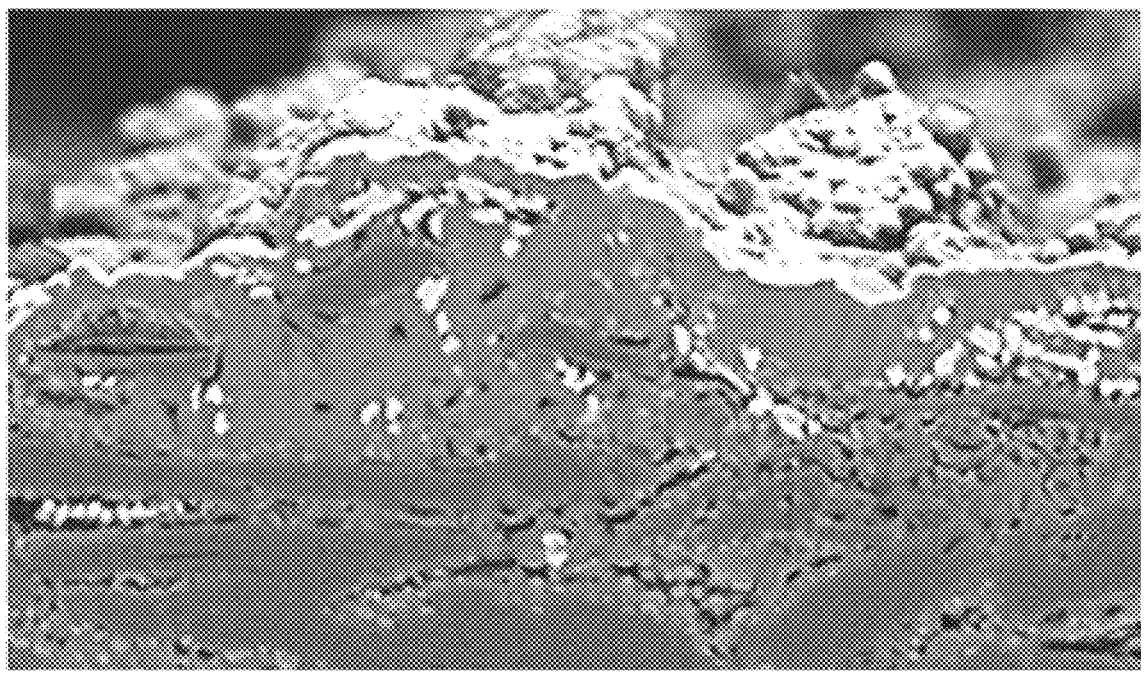
FIG. 26 is a SEM image showing a surface of a negative electrode cross section when a lithium secondary battery including both of a negative electrode with a negative electrode function layer and a positive electrode is shut down.

The lithium secondary battery according to an embodiment of the present disclosure may include both of the negative electrode function layer positioned on the negative electrode and the positive electrode active material layer including the first positive electrode active material and the second positive electrode active material, thereby reducing thermal runaway due to thermal/physical impacts and assisting the flake-shaped polyethylene particles in being melted to shut down (or perfectly shut down) ion passages. In a secondary battery not including the positive electrode according to an embodiment of the present disclosure, the ion passages may not be perfectly shut down during thermal runaway due to thermal/physical impacts (see FIG. 25). However, in a secondary battery including both of the negative electrode including the negative electrode function layer and the positive electrode according to an embodiment of the present disclosure, the ion passages can be shut down (or perfectly shut down) during thermal runaway due to thermal/physical impacts, thereby obtaining a safety maximizing or increasing effect (see FIG. 26).

Meanwhile, the positive electrode 125b may include a positive electrode current collector and a positive electrode active material layer positioned on the positive electrode current collector.

The positive electrode active material layer may include the first positive electrode active material including at least one composite oxide of lithium and a metal of cobalt, manganese, nickel, or a combination thereof, and the second positive electrode active material including a compound represented by the Chemical Formula (1).

$$\text{LiaFe1-xMxPO4} \qquad (1)$$ 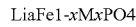

wherein 0.90≤a≤1.8, 0≤x≤0.7, and M is Mn, Co, Ni or combinations thereof.

In addition, the positive electrode active material layer may further include a positive electrode function layer positioned on the positive electrode active material layer.

The first positive electrode active material may be at least one composite oxide of lithium and a metal of cobalt, manganese, nickel, or a combination thereof. Examples of the first positive electrode active material may include a compound represented by one of the following Chemical Formulas:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α<2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $Li_aFePO_4$ (0.90≤a≤1.8).

In the above chemical formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Here, the compounds may have a coating layer on the surface, or may be mixed with another compound having a coating layer. The coating layer may include at least one coating element compound selected from the group of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable coating method (for example, spray coating or dipping) that demonstrates no adverse influence (or substantially no adverse influence) on properties of the positive electrode active material by using these elements in the compound, which will be well understood by one skilled in the art and further description thereof is not necessary here.

In an embodiment, the first positive electrode active material and the second positive electrode active material may be included in a weight ratio in a range from 97:3 to 80:20, for example, 95:5 to 85:15.

The first positive electrode active material may be included in an amount in a range from 70 wt % to 99 wt % based on the total weight of the positive electrode active material layer, for example, 85 wt % to 99 wt %, 87 wt % to 95 wt %, or 90 wt % to 98 wt %. When the amount of the first positive electrode active material satisfies the range, the safety can be improved without a reduction in the capacity.

The second positive electrode active material may include, for example, $LiFePO_4$.

The second positive electrode active material may be included in an amount in a range from 1 wt % to 15 wt % based on the total weight of the positive electrode active material layer, for example, 2 wt % to 15 wt %, 2 wt % to 12 wt %, or 2 wt % to 10 wt %. When the amount of the second positive electrode active material satisfies the range, the safety can be improved without a reduction in the capacity.

Usable examples of the positive electrode current collector may include, but not limited to, aluminum and nickel.

Optionally, the positive electrode active material layer may further include a positive electrode conductive material and a positive electrode binder.

Each of the positive electrode conductive material and the positive electrode binder may be included in an amount in a range from 1 wt % to 5 wt % based on the total weight of the positive electrode active material layer.

The positive electrode conductive material may be used to provide the positive electrode with conductivity (e.g., electrical conductivity), and kinds of the positive electrode conductive material are the same as those of the negative electrode conductive material.

The positive electrode binder may serve to improve binding properties of the positive active material particles with one another and with a current collector, and examples of the positive electrode binder may include, but not limited to, polyvinyl alcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The electrolyte includes a non-aqueous organic solvent and a lithium salt.

The non-aqueous organic solvent serves as a medium for transmitting ions taking part in the electrochemical reaction of a battery. Examples of the non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, methylpropionate, ethylpropionate, γ-butyrolactone, decanolide, valerolactone, mevalonolactone, caprolactone and the like. Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone, and the like. In addition, examples of the alcohol-based solvent may include ethyl alcohol, isopropyl alcohol, and the like, and examples of the aprotic solvent may include nitriles, such as R—CN (wherein R is a C2 to C20 linear, branched, or cyclic hydrocarbon group, or includes a double bond, an aromatic ring, or an ether bond), amides, such as dimethylformamide, dioxolanes, such as 1,3-dioxolane, or sulfolanes.

The non-aqueous organic solvent may be used alone or in a mixture of more than one material. When the non-aqueous organic solvent is used in a mixture, the mixture ratio can be controlled in accordance with desirable battery performance and can be any suitable mixture ratio generally used in the art.

In addition, the carbonate-based solvent may be used by mixing a cyclic carbonate and a chain-type carbonate. In this case, when the cyclic carbonate and the chain-type carbonate are mixed together to a volume ratio in a range from 1:1 to 1:9, excellent performance of the electrolyte may be demonstrated.

The aromatic hydrocarbon-based organic solvent may be an aromatic hydrocarbon-based compound represented by the following Chemical Formula (2):

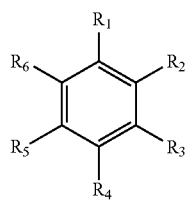

(2)

wherein R1 to R6 are the same or different and are selected from the group consisting of a hydrogen, a halogen, a C1 to C10 alkyl group, a C1 to C10 haloalkyl group, and a combination thereof.

Examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In order to improve the cycle life of a battery, the non-aqueous electrolyte may further include vinylene carbonate or an ethylene carbonate-based compound represented by the following Chemical Formula (3):

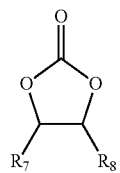

(3)

wherein R7 and R8 are the same or different and are selected from the group consisting of a hydrogen, a halogen group, a cyano group (CN), a nitro group (NO2) and a fluorinated C1 to C5 alkyl group, wherein at least one of the R7 and R8 is a halogen group, a cyano group (CN), a nitro group (NO2), or a fluorinated C1 to C5 alkyl group, but both of R7 and R8 are not necessarily hydrogens.

Representative examples of the ethylene carbonate-based compound may include difluoro ethylene carbonate, chloroethylene carbonate, dichloroethylene carbonate, bromoethylenecarbonate, dibromoethylene carbonate, nitroethylene carbonate, cyanoethylenecarbonate, fluoroethylene carbonate, and the like. When an additive for improving the cycle life is additionally used, the amount of the additive may be suitably or appropriately controlled.

The lithium salt dissolved in the organic solvent functions as a supply source of lithium ions in the battery to enable a basic operation of a rechargeable lithium battery and promotes movement of lithium ions between positive and negative electrodes. Examples of the lithium salt may include as a supporting salt one or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI and $LiB(C_2O_4)_2$, and lithium bis(oxalato) borate (LiBOB). The lithium salt may be used at a concentration in a range from 0.1 M to 2.0 M, and in one embodiment, at a concentration in a range from 0.5 to 2.0 M. When the lithium salt is included at the above concentration range, the electrolyte may demonstrate suitable or appropriate conductivity and viscosity, thereby enhancing lithium ion mobility.

As described above, the separator 125c may be positioned between the positive electrode 125b and the negative electrode 125a. The separator 125c may be made of, for example, one selected from a glass fiber, polyester, polyethylene, polypropylene, polytetrafluoroethylene and a combination thereof, and may be a non-woven or woven material.

The separator made of, for example, a polyolefin-based polymer, such as polyethylene or polypropylene, may be mainly used for a lithium secondary battery. In order to obtain heat resistance or mechanical strength, a separator coated with a composition including a ceramic component or a polymeric material, may be used and, optionally, may have a single-layered structure or a multi-layered structure.

The following examples illustrate aspects of the present disclosure in more detail. These examples, however, are provided only for illustrative purposes but are not intended to limit the scope of the present disclosure.

Fabrication of Lithium Secondary Battery

Example 1: Battery Including 2 μm Flake-Shaped PE Particles

A positive electrode active material slurry was prepared by mixing 95 wt % of a positive electrode active material having $LiCoO_2/LiFePO_4$ (LCO/LFP) mixed to a weight ratio of 9:1, 3 wt % of polyvinylidenfluoride as a binder, and 2 wt % ketjen black as a conductive material in N-methylpyrrolidone as a solvent. The positive electrode active material slurry was coated on both surfaces of an Al current collector, dried and pressed to provide a positive electrode (cathode) including a positive electrode active material layer.

A negative electrode active material slurry was prepared by mixing 98 wt % of graphite, 0.8 wt % of carboxymethyl cellulose and 1.2 wt % of styrene-butadiene rubber in pure water. The negative electrode active material slurry was coated on both surfaces of a Cu current collector, dried and pressed to provide a negative electrode (anode) including a negative electrode active material layer.

48 wt % offlake-shaped PE particles having an average particle size of 2 μm (Major axis length/Minor axis length=about 2, thickness=about 0.6 μm), 47 wt % of alumina (Average particle diameter (D50)=0.7 μm) and 5 wt % of acrylated styrene-based rubber as a binder were mixed in an alcohol-based solvent to prepare a PE/alumina slurry.

The PE/alumina slurry was coated on the surface of the negative electrode, dried and pressed to provide a coated negative electrode including a coating layer including flake-shaped PE particles.

The positive electrode, the separator including a PE/PP multi-layered substrate, and the negative electrode including the coating layer including the flake-shaped PE particles were sequentially stacked to fabricate an electrode assembly shown in FIGS. 17A and 17B, followed by injecting an electrolyte, thereby fabricating a secondary battery.

Example 2: Battery Including 4 μm Flake-Shaped PE Particles

A secondary battery was fabricated in the same manner as in Example 1, except that a negative electrode was provided using flake-shaped PE particles having an average particle size of 4 μm (Major axis length/Minor axis length=about 2.4, thickness=about 0.6 μm).

Example 3: Battery Including 6 μm Flake-Shaped PE Particles

A secondary battery was fabricated in substantially the same manner as in Example 1, except that a negative electrode was provided using flake-shaped PE particles having an average particle size of 6 μm (Major axis length/Minor axis length=about 2.4, thickness=about 0.6 μm).

Comparative Example: Battery Including Spherical PE Particles

A secondary battery was fabricated in substantially the same manner as in Example 1, except that a negative electrode was provided using a dispersion liquid prepared by dispersing spherical PE particles having an average particle size of 4 μm, instead of 2 μm flake-shaped PE particles, in an alcohol-based solvent.

Evaluation Example

1. Evaluation of Electrode Plate Resistance Increase Rates

Figure 24:
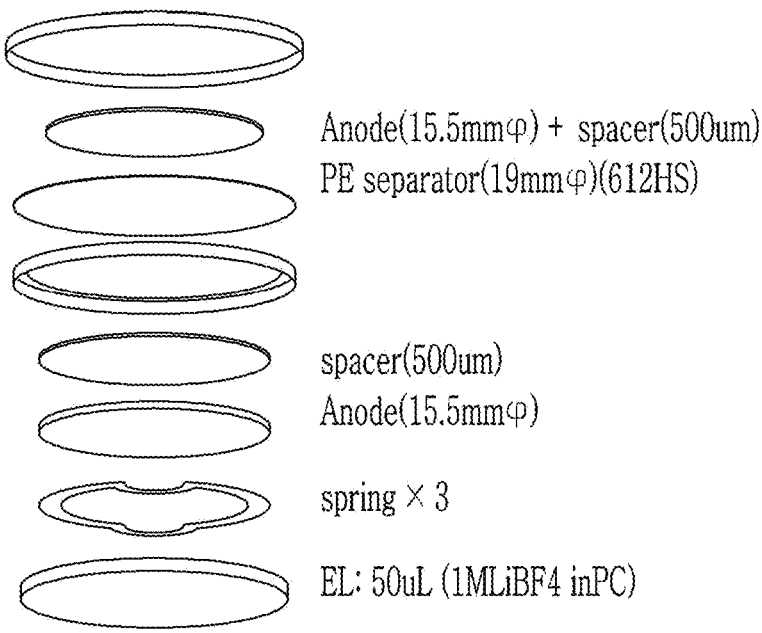
FIG. 24 is a diagram showing a symmetrical coin-type cell fabricated for evaluating resistance increase rates of an electrode plate.

A negative electrode (anode) including a coating layer including the flake-shaped PE particles according to Example 1, a separator including a PE/PP multi-layered substrate, and a negative electrode including a coating layer including the flake-shaped PE particles according to Example 1, were sequentially stacked in that order, followed by injecting an electrolyte prepared by dissolving 1M LiBF4 in propylene carbonate (PC), thereby fabricating a symmetrical coin-type battery shown in FIG. 24.

FIG. 24 is a diagram showing symmetrical coin-type batteries fabricated for evaluating resistance increase rates of electrode plates.

A temperature sensor and a resistance meter were installed on the fabricated symmetrical coin-type battery, and the battery was inserted into a temperature-varying chamber for evaluation. Changes in temperatures and resistances of the symmetrical coin-type battery were evaluated while increasing the temperature at a rate of 10° C./min, and increase rate evaluation results of AC resistance (ACR) (ohm) of electrode plates depending on the temperature is shown in FIG. 22.

Figure 22:
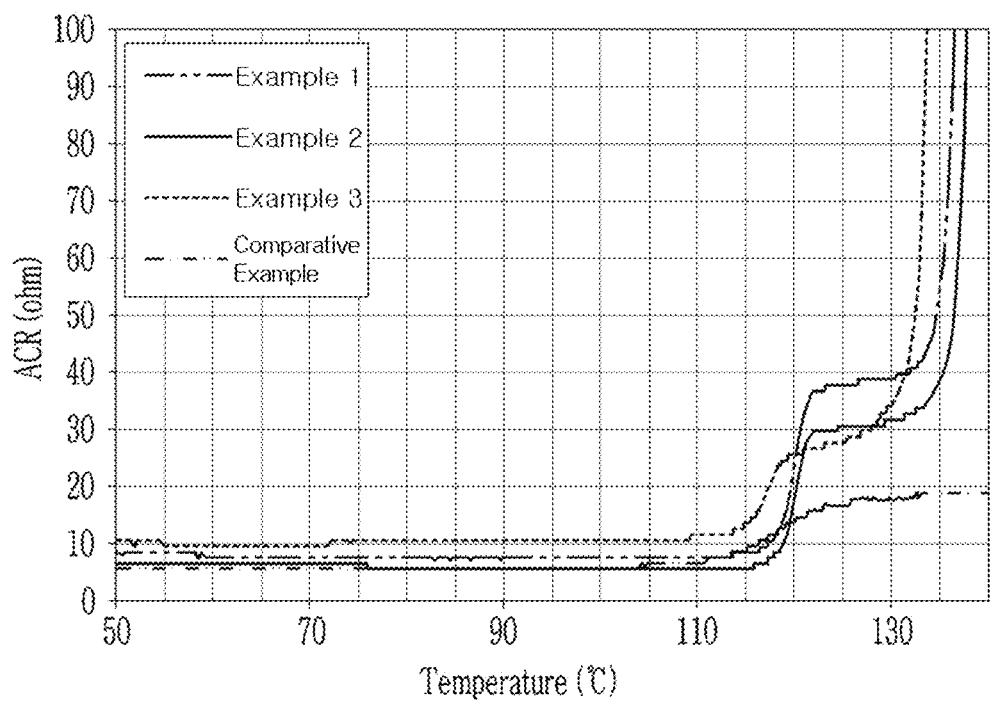
FIG. 22 is a graph showing ACR increase rate evaluation results of electrode plates depending on temperatures.

FIG. 22 is a graph showing ACR increase rate evaluation results of electrode plates depending on temperatures.

As confirmed from FIG. 22, AC resistance (ACR) increase rates of electrode plates in Examples 1 to 3 were remarkably increased at a high temperature of 120° C. or higher, compared to the ACR increase rate of an electrode plate in Comparative Example.

From the evaluation results, in the battery cell including the electrode composition according to an embodiment, ion passages can be effectively shut down during thermal runaway due to thermal/physical impacts. Therefore, it can be expected for a shut-down function to be manifested quickly.

2. Evaluation of Cycle-Life Characteristics

Figure 23:
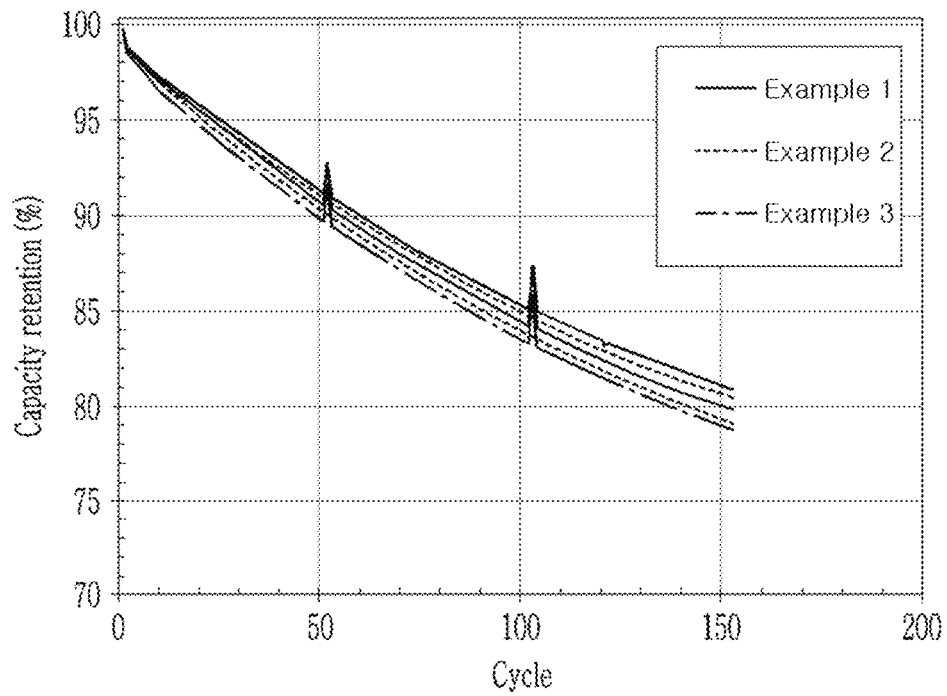
FIG. 23 is a graph showing capacity retention evaluation results of lithium secondary batteries according to Examples for 150 cycles.

Lithium secondary batteries fabricated in Examples 1 to 3 were charged at a charge potential of 4.4 V at 0.5 C/0.5 C rates and then discharged to reach 3.0 V. After 150 cycles, cell capacity decrease rates were measured, and the results are shown in FIG. 23. At the 51st and 101st cycles, the battery cells were charged at a charge potential of 4.4 V at 0.5 C/0.5 C and then discharged to reach 3.0 V. Then, capacity retentions were measured to evaluate capacity recovery.

FIG. 23 is a graph showing capacity retention evaluation results of lithium secondary batteries according to Examples 1 to 3 for 150 cycles.

Referring to FIG. 23, even after 150 cycles, it was confirmed that excellent capacity retention ratios (%) were demonstrated.

As a result, the lithium secondary battery according to an embodiment of the present disclosure can effectively demonstrate a shut-down function while maintaining excellent battery characteristics.

While the subject matter of the present disclosure has been shown and described with reference to exemplary embodiments thereof, it will be understood by those of ordinary skill in the art that various changes in form and details may be made therein without departing from the spirit and scope of the present disclosure as defined by the following claims and their equivalents.

What is claimed is:

1. An energy storage module comprising:
    a cover member accommodating a plurality of battery cells in an internal receiving space, each of the battery cells comprising a vent;
    a top plate above the battery cells in a first direction, coupled to a top of the cover member, and comprising a duct corresponding to the vent of at least one of the battery cells;
    a top cover above the top plate in the first direction, coupled to a top of the top plate, and having an exhaust area corresponding to the duct, the exhaust area having a plurality of discharge openings, the top cover comprising a protrusion protruding in the first direction from a bottom surface of the top cover, the protrusion extending around a periphery of the exhaust area and around a distal end of the duct; and
    an extinguisher sheet between the top cover and the top plate in the first direction and offset from: (1) the protrusion of the top cover; (2) the duct of the top plate;

and (3) the vent of the at least one of the battery cells in a second direction perpendicular to the first direction, the extinguisher sheet being configured to emit a fire extinguishing agent at a reference temperature to an area between the top plate and the top cover.

2. The energy storage module of claim 1, wherein the top cover further comprises an inclined surface having a gradually increasing thickness from the exhaust area to the protrusion.

3. The energy storage module of claim 2, wherein a distal end of the duct is arranged under the inclined surface.

4. The energy storage module of claim 2, wherein the duct has a smaller cross-sectional area than the protrusion such that a space is between the duct and the protrusion such that some of the gas emitted from the vent passes through the duct and into the space along the inclined surface.

5. The energy storage module of claim 1, wherein an inner diameter of the duct decreases along an upward direction away from the battery cell.

6. The energy storage module of claim 1, wherein a portion of the exhaust area of the top cover extends over the duct.

7. The energy storage module of claim 1, wherein the exhaust area of the top cover has a smaller thickness than another area of the top cover adjacent the exhaust area.

8. The energy storage module of claim 1, wherein the exhaust area is recessed downwardly from other areas of the top cover.

9. The energy storage module of claim 1, wherein an overall area of the discharge openings in the exhaust area is greater than 30% of an overall area of the exhaust area.

10. The energy storage module of claim 1, further comprising insulation spacers respectively positioned between adjacent ones of the battery cells,
wherein the top plate comprises openings respectively corresponding to the insulation spacers.

11. The energy storage module of claim 1, wherein the protrusion contacts the bottom surface of the top cover.

12. The energy storage module of claim 1, wherein a distance between a bottom surface of the protrusion and the battery cells is smaller than a distance between an upper surface of the duct and the battery cells.

13. A system comprising:
the energy storage module of claim 1; and
a rack comprising a frame and shelves, the energy storage module being accommodated on one of the shelves,
wherein a distance between the top cover of the energy storage module and another one of the shelves above the energy storage module is in a range of 3 mm to 7 mm.

14. The system of claim 13, further comprising a plurality of the energy storage modules,
wherein at least one of the energy storage modules is on each of the shelves of the rack.

15. The energy storage module of claim 1, wherein each of the battery cells comprises:
a negative electrode comprising a negative electrode current collector, a negative electrode active material layer on the negative electrode current collector, and a negative electrode function layer on the negative electrode active material layer; and
a positive electrode comprising a positive electrode current collector and a positive electrode active material layer on the positive electrode current collector,
wherein the negative electrode function layer comprises flake-shaped polyethylene particles, and the positive electrode active material layer comprises a first positive electrode active material comprising at least one composite oxide of lithium and a metal selected from the group consisting of cobalt (Co), manganese (Mn), nickel (Ni) and a combination of these metals, and a second positive electrode active material comprising a compound represented by the Chemical Formula (1):

$$Li_aFe_{1-x}M_xPO_4 \quad (1)$$

wherein $0.90 \le a \le 1.8$, $0 \le x \le 0.7$, and M is Mn, Co, Ni or combinations thereof.

16. The energy storage module of claim 15, wherein the flake-shaped polyethylene particles have an average particle diameter (D50) in a range from 1 μm to 8 μm.

17. The energy storage module of claim 15, wherein the flake-shaped polyethylene particles have an average particle diameter (D50) in a range from 2 μm to 6 μm.

18. The energy storage module of claim 15, wherein the flake-shaped polyethylene particles have a thickness in a range from 0.2 μm to 4 μm.

19. The energy storage module of claim 15, wherein the first positive electrode active material and the second positive electrode active material are contained in a weight ratio in a range from 97:3 to 80:20.

* * * * *